(12) United States Patent
Qu et al.

(10) Patent No.: US 11,774,230 B2
(45) Date of Patent: Oct. 3, 2023

(54) FLEXIBLE METHOD AND APPARATUS FOR THICKNESS MEASUREMENT

(71) Applicant: Yantai Unversity, Yantai (CN)

(72) Inventors: Shuying Qu, Yantai (CN); Jianglong Wu, Yantai (CN); Yang Lu, Yantai (CN)

(73) Assignee: Yantai Unversity, Yantai (CN)

( * ) Notice: Subject to any disclaimer, the term of this patent is extended or adjusted under 35 U.S.C. 154(b) by 692 days.

(21) Appl. No.: 17/001,869

(22) Filed: Aug. 25, 2020

(65) Prior Publication Data

US 2021/0116229 A1 Apr. 22, 2021

(30) Foreign Application Priority Data

Oct. 17, 2019 (CN) .......................... 201910987620.1

(51) Int. Cl.
*G01B 7/06* (2006.01)
(52) U.S. Cl.
CPC ...................... *G01B 7/06* (2013.01)
(58) Field of Classification Search
CPC .......................................................... G01B 7/06
USPC ........................... 33/783, 784, 810, 811, 812
See application file for complete search history.

(56) References Cited

U.S. PATENT DOCUMENTS

| 4,279,079 A * | 7/1981 | Gamberini | G01B 5/00 33/783 |
| 6,473,987 B1 * | 11/2002 | Steere, III | G01B 5/06 33/549 |
| 8,146,263 B2 * | 4/2012 | Kipnes | G01D 11/30 33/783 |
| 9,212,884 B2 * | 12/2015 | Zhang | G01B 3/205 |
| 9,772,205 B2 * | 9/2017 | Fischer | G01D 11/30 |
| 2008/0229604 A1 * | 9/2008 | Wo | G01B 3/205 33/784 |
| 2019/0264764 A1 * | 8/2019 | Lin | F16D 66/027 |

* cited by examiner

*Primary Examiner* — George B Bennett
(74) *Attorney, Agent, or Firm* — McCarter & English, LLP; Yu Lu

(57) ABSTRACT

The present invention discloses a flexible method and apparatus for thickness measurement. The apparatus includes seven parts: a measurement host, an etalon, a tested piece, a test piece positioning support, a driver, and a digital controller. The measurement host includes a rack, a coding lead screw, and a dual-acting cantilever sensor. The coding lead screw includes a micro-metering lead screw and a tri-state encoder. The tri-state encoder includes a fluted disc and four pairs of cantilever sensors. The dual-acting cantilever sensor includes left and right mobile cantilever sensors with a pair of clipping pin. The digital controller contains system measurement software.

1 Claim, 6 Drawing Sheets

(a) (b)

(c) (d)

(a) (b)

FLEXIBLE METHOD AND APPARATUS FOR THICKNESS MEASUREMENT

REFERENCE TO RELATED APPLICATION

This application claims foreign priority to Chinese Patent Application No. CN 201910987620. 1, filed on Oct. 17, 2019, the entire content of which are incorporated herein by reference.

TECHNICAL FIELD

The present invention provides a flexible method and apparatus for thickness measurement, to measure a thickness of a sample in a material mechanical property test and a thickness of a general mechanical part. Specifically, the present invention belongs to the technical fields of sensors, mechanical tests, and mechanical measurement.

BACKGROUND OF THE INVENTION

A double cantilever thickness gauge[1] is a resistance strain gauge with resolution of less than 0.002 mm, and can measure thicknesses of tensile samples and thicknesses of other similar mechanical parts with constant sections. Measurement precision is not affected by the factors of manual operation. Therefore, the double cantilever thickness gauge is adapted to a data processing instrument. However, a range of such a gauge is generally less than 2 mm, because a measurement range of a resistance strain sensor is limited by deformation of an elastomer. In industrial and other application fields, there is a wide need for a thickness measurement technology capable of measuring 0-200 mm with resolution of 0.001-0.01 mm, or even a larger range. However, existing resistance strain thickness measurement methods cannot meet this requirement.

[1] "RESISTANCE STRAIN THICKNESS MEASUREMENT APPARATUS AND METHOD FOR USING SAME", Chinese patent with the patent number ZL201110325452.3.

SUMMARY OF THE INVENTION

An objective of the present invention is to provide a flexible measurement method and apparatus for measuring a thickness of a sample for a material mechanical property test and a thickness of a general mechanical part, where the flexible measurement method has resolution equivalent to that of a resistance strain thickness measurement method and can greatly increase a range.

The present invention provides a flexible method and apparatus for thickness measurement. For the method and apparatus, a measurement host, an etalon, a positioning block, a tested piece, an etalon support, a tested piece support, a driver, and a digital controller are included, to form a measurement system.

The measurement host includes a rack, a coding lead screw, and a dual-acting cantilever sensor. A structure of the rack includes a base plate, a left bearing support plate and a right bearing support plate that are fastened on the base plate, and a support positioning slot is provided on the base plate, and is used to mount the etalon support and the tested piece support. The left bearing support plate and the right bearing support plate are parallel to each other, separated on two sides of the support positioning slot, and parallel to the support positioning slot. One circular through hole is formed on each of the left bearing support plate and the right bearing support plate, and a left bearing and a right bearing are respectively embedded in the two circular through holes, and are coaxially positioned. The coding lead screw is a functional component that may measure displacement, and includes a micro-metering lead screw and a tri-state encoder. The micro-metering lead screw is a threaded step shaft, and a structure of the micro-metering lead screw is divided into five segments from left to right: I-II, II-III, III-IV, IV-V, and V-VI, the segment I-II and the segment V-VI are round axles, the segment II-III is a left-hand threaded shaft, the segment IV-V is a right-hand threaded shaft, and the segment III-IV is a circular shaft. The circular shaft of the segment III-IV may also be referred to as a barricade, a diameter of the circular shaft of the segment III-IV is greater than an outer diameter of each of the two threaded shafts, and an outer diameter of each of the two threaded shafts is greater than a diameter of each of the two round axles. The round axle of the segment I-II cooperates with the left bearing, the round axle of the segment V-VI cooperates with the right bearing, a left end surface of the left-hand threaded shaft of the segment II-III cooperates with a right end surface of the left bearing, a right end surface of the right-hand threaded shaft of the segment IV-V cooperates with a left end surface of the right bearing, and the four cooperation pairs all take a clearance elimination measure. Therefore, it may be theoretically considered that the micro-metering lead screw only rotates one degree of motion freedom around an axis of the micro-metering lead screw. The tri-state encoder is a mechanical-resistance strain displacement sensor, and includes a fluted disc, a sensor bracket, an upper left cantilever sensor, an upper right cantilever sensor, a lower left cantilever sensor, and a lower right cantilever sensor. The fluted disc is provided with circular arc teeth, and the fluted disc and the circular arc teeth are coaxially fastened on the round axle of the segment V-VI of the micro-metering lead screw, and are located on a right side of the right bearing. A quantity of the circular arc teeth is an integral multiple of 4. The sensor bracket is a rectangular frame fastened on the rack, and a rectangular through hole whose axis is parallel to a frame plane and is perpendicular to a side on which the rectangular through hole is located and a threaded hole perpendicularly communicating with the rectangular through hole are sequentially provided at a position near a side corner of each of four sides. The fluted disc is surrounded in the middle by the sensor bracket. The upper left cantilever sensor, the upper right cantilever sensor, the lower left cantilever sensor, and the lower right cantilever sensor use constant-section elastic beams or variable-section elastic beams, root portions of the four elastic beams respectively cooperate with the four rectangular through holes on the sensor bracket, and the four elastic beams are fastened on an inner wall of an upper side, an inner wall of a lower side, an inner wall of a right side, and an inner wall of a left side of the sensor bracket by using pressing force of the set screw. Single-axis resistance strain gauges [$R_5$, $R_6$], [$R_7$, $R_8$], [$R_9$, $R_{10}$], and [$R_{11}$, $R_{12}$] are respectively stuck in a cantilever axis direction at positions near the root portions of the four elastic beams. A left triangular convex edge, an upper triangular convex edge, a right triangular convex edge, and a lower triangular convex edge are respectively provided on a side that faces towards the fluted disc and that is close to free ends of the four elastic beams. All the four elastic beams have certain predeformation, elastic pressure generated through the predeformation enables edge vertexes of the left triangular convex edge, the upper triangular convex edge, the right triangular convex edge, and the lower triangular convex edge to separately come into contact with the circular arc teeth on a periphery of the fluted disc, and specific positions of contact points are determined according to the following conditions:

a. It is assumed that a longitudinal symmetric line of the fluted disc just passes through a center of the directly above circular arc tooth and a center of the directly below circular arc tooth, and a horizontal symmetric line of the fluted disc just passes through a center of the leftmost circular arc tooth and a center of the rightmost circular arc tooth.

b. In this case, the left triangular convex edge is located on the horizontal symmetric line of the fluted disc, and just comes into contact with a vertex of the leftmost circular arc tooth. The right triangular convex edge is located above the horizontal symmetric line of the fluted disc and the rightmost circular arc tooth, and is just aligned with a valley bottom between two adjacent arc teeth. Both the upper triangular convex edge and the lower triangular convex edge are both located on a right side of the longitudinal symmetric line of the fluted disc, and respectively come into contact with a right side of the directly above circular arc tooth and a right side of the directly below circular arc tooth. A distance from the left triangular convex edge to the longitudinal symmetric line of the fluted disc is indicated by $h_{max}$, a distance from the right triangular convex edge to the longitudinal symmetric line of the fluted disc is indicated by $h_{mm}$, a distance from a contact point between the upper triangular convex edge and the directly above circular arc tooth to the horizontal symmetric line of the fluted disc is indicated by $h_{mid}$, and a distance from a contact point between the lower triangular convex edge and the directly below circular arc tooth to the horizontal symmetric line of the fluted disc is also indicated by $h_{mid}$. A relationship indicated by a formula (1) exists among $h_{mid}$, $h_{min}$, and $h_{max}$:

$$h_{mid} = \frac{h_{min} + h_{max}}{2}. \quad (1)$$

$h_{mm}$, $h_{mid}$, and $h_{max}$ are referred to as feature heights, $h_{min}$ is a minimum feature height, $h_{mid}$ is an average feature height, and $h_{max}$ is a maximum feature height. The dual-acting cantilever sensor includes a left cantilever sensor and a right cantilever sensor, and the two have a same structure and size. The structure of the left cantilever sensor includes a variable-section elastic beam, a left holding clipping pin fastened on a right side of a free end of the elastic beam, single-axis resistance strain gauges [$R_1$, $R_2$] stuck on left and right sides near a root portion of the cantilever, a left driving nut embedded into the root portion of the cantilever, and a left dowel pin fastened at a bottom portion of the cantilever, and the left cantilever sensor is mounted on the rack through cooperation between the left driving nut and the left-hand threaded shaft of the segment II-III on the micro-metering lead screw and cooperation between the left dowel pin and a U-shaped guiding limiting slot. The structure of the right cantilever sensor includes a variable-section elastic beam, a right holding clipping pin fastened on a left side of the free end of the elastic beam, single-axis resistance strain gauges [$R_3$, $R_4$] stuck on left and right sides near the root portion of the cantilever, a right driving nut embedded into the root portion of the cantilever, and a right dowel pin fastened at the bottom portion of the cantilever, and the right cantilever sensor is mounted on the rack through cooperation between the right driving nut and the right-hand threaded shaft of the segment IV-V on the micro-metering lead screw and cooperation between the right dowel pin and the U-shaped guiding limiting slot. Cooperation between the left dowel pin and the U-shaped guiding limiting slot and cooperation between the right dowel pin and the U-shaped guiding limiting slot enable the left cantilever sensor and the right cantilever sensor to be incapable of rotation, and to be capable of only horizontal movement, and when the drive lead screw rotates, the left cantilever sensor and the right cantilever sensor are driven to move towards or away from each other along an axis of the micro-metering lead screw. A cooperation pair of the left driving nut and the micro-metering lead screw and a cooperation pair of the right driving nut and the micro-metering lead screw both use a clearance elimination measure, it is theoretically considered that a degree of motion freedom of the micro-metering lead screw in a plane x-y is zero, and when the micro-metering lead screw changes a rotation direction, the left driving nut and the right driving nut can be driven to change a movement direction without hysteresis. The variable-section elastic beam of the left cantilever sensor and the variable-section elastic beam of the right cantilever sensor both have a same shape, size, and material, a cross section of a beam is rectangular, two segments that are a rigid segment ac and a flexible segment ce are obtained through division from a free end a to a root portion e, the rigid segment ac has a same width as the flexible segment ce, and a height H of the rigid segment ac is greater than a height h of the flexible segment ce. The left cantilever sensor and the right cantilever sensor are symmetrically positioned, and free ends of the two are vertically upward. The left holding clipping pin and the right holding clipping pin are coaxially positioned, and a vertex distance between the two is indicated by s. The resistance strain gauges $R_1$, $R_2$, $R_3$, and $R_4$ constitute a full-bridge measurement circuit, and a strain signal generated by the circuit is indicated by $\varepsilon_r$.

The etalon 0 includes several standard block gauges, and an etalon positioning key is provided beneath the standard block gauge. Thickness values of the standard block gauges are sequentially indicated by $\delta_1$, $\delta_2$, . . . , and $\delta_n$. $\delta_1$, $\delta_2$, . . . . , and $\delta_n$ are also used to denote standard block gauges with different thicknesses. The thickness values of the standard block gauges are arranged in an order of $\delta_1 < \delta_2$, . . . , $< \delta_n$, where n≥2, indicating a quantity of the standard block gauges.

Thicknesses of etalon positioning keys of the standard block gauges are equal, and are indicated by t. Any one of the standard block gauges is selected, and is defined as a reference gauge, and a thickness value of the reference gauge is defined as a reference thickness, and is indicated by $\delta_0$. An arithmetic mean of $\delta_1$, $\delta_2$, . . . , $\delta_n$ is indicated by $\bar{\delta}$.

The positioning block is a block whose lower portion is provided with a slot, the slot is used to cooperate with left and right end surfaces of the circular shaft of the segment III-IV on the micro-metering lead screw, and a width of the slot has a same nominal size as a length of the circular shaft of the segment III-IV on the micro-metering lead screw. The slot cooperates with the two end surfaces that are the left and right end surfaces of the circular shaft of the segment III-IV, to insert the positioning block into a top portion of the circular shaft of the segment III-IV, and a right side surface of a root portion of the left cantilever sensor and a left side surface of a root portion of the right cantilever sensor respectively abut against the two end surfaces that are the left and right end surfaces in a length direction of the positioning block; in this way, a distance $S_0$ between the left holding clipping pin and the right holding clipping pin is less than a minimum thickness value $\delta_1$ of the etalon, in other words, $S_0<\delta_1$. $S_0$ is defined as a reference distance of the dual-acting cantilever sensor, and is briefly referred to as a reference distance.

The tested piece is a plate sample for a material mechanical property test, a curved section sample, or another rigid mechanical part whose thickness needs to be measured.

The etalon support includes two columns that are front and rear columns having a same shape and size, a top portion of the column is provided with an etalon positioning slot, and a bottom portion of the column is provided with an etalon support positioning key. A nominal width of the etalon positioning slot is equal to a nominal thickness t of the etalon positioning key on the standard block gauge. The etalon support positioning key has the same nominal width as the support positioning slot. When the etalon support positioning key is inserted into the support positioning slot, a longitudinal symmetric plane of the etalon positioning slot coincides with a longitudinal symmetric plane of the left holding clipping pin and a longitudinal symmetric plane of the right holding clipping pin.

The tested piece support is of a "Π"-shaped structure, an upper portion of the tested piece support is a platform or a platform surface of another shape processed according to geometric parameters of the tested piece, and the two columns that are the front and rear columns that have the same shape and size are provided below the tested piece support; a tested piece support positioning key is provided at a bottom portion of the column.

The driver is a stepper motor, or is a driving mechanism including a motor and a transmission such as a worm-gear or a gear train.

The digital controller (not shown in the figure) is a microcomputer system including a strain signal collection-conditioning circuit, a driver control circuit, and measurement software; the measurement software is designed and implemented according to the following measurement method and idea.

A mechanism combining the coding lead screw and the dual-acting cantilever works in the following manner:

(1) Connection of measurement circuits of the tri-state encoder: Resistance strain gauges [$R_5$, $R_6$], [$R_7$, $R_8$], [$R_9$, $R_{10}$], and [$R_{11}$, $R_{12}$] separately access the digital controller in a half-bridge manner, and $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ are respectively used to indicate strain readings of the four half-bridge measurement circuits measured by the digital controller.

(2) Adjustment of a zero position of the measurement circuit of the tri-state encoder: The digital controller is configured to control the driver to operate, to drive the fluted disc 18 to rotate, the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ measured by the digital controller accordingly periodically change continuously, a change period is indicated by T, and T also indicates a tooth vertex distance between two adjacent circular arc teeth on the fluted disc. Each time the fluted disc rotates by one tooth, in other words, one period T, the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ separately complete circulation once. A change in $\varepsilon_{r(R_5,R_6)}$ is tracked and observed, and when $\varepsilon_{r(R_5,R_6)}$ reaches a minimum value $\varepsilon_{rmin}$, the fluted disc stops rotating, and the digital controller is configured to adjust a balanced circuit of a bridge on which the resistance strain gauges [$R_5$, $R_6$] are located, so that the resistance strain gauges reach a balanced state, in other words, $\varepsilon_{r(R_5,R_6)}=0$. The foregoing actions are repeated, and when $\varepsilon_{r(R_7,R_8)}$, $\varepsilon_{r(R_9,R_{10})}$, and $\varepsilon_{r(R_{11},R_{12})}$ reaches the minimum value $\varepsilon_{rmin}$, balanced circuits of bridges on which the resistance strain gauges [$R_7$, $R_8$], [$R_9$, $R_{10}$], and [$R_{11}$, $R_{12}$] are located are sequentially adjusted, so that, $\varepsilon_{r(R_7,R_8)}=0$, $\varepsilon_{r(R_9,R_{10})}=0$, and $\varepsilon_{r(R_{11},R_{12})}=0$. After zero positions of four half-bridge measurement circuits are adjusted, the fluted disc rotates, and in this way, the strain readings $\varepsilon_{r(R_5,R_6)}$, $\varepsilon_{r(R_7,R_8)}$, $\varepsilon_{r(R_9,R_{10})}$ and $\varepsilon_{r(R_{11},R_{12})}$ all cyclically change between a minimum value 0 and a maximum value $\varepsilon_{rmax}$, the minimum value 0 corresponds to a valley bottom position between two adjacent circular arc teeth over against the left triangular convex edge, the upper triangular convex edge, the right triangular convex edge, or the lower triangular convex edge, in other words, corresponds to the minimum feature height $h_{min}$, and the maximum value $\varepsilon_{rmax}$ corresponds to a position at which the left triangular convex edge, the upper triangular convex edge, the right triangular convex edge, or the lower triangular convex edge comes into contact with a vertex of the circular arc tooth, in other words, corresponds to the maximum feature height $h_{max}$. The foregoing method for adjusting the zero position of the measurement circuit of the tri-state encoder is referred to as a four-step zero position adjustment method.

(3) A relationship between a strain reading and a rotation status of the fluted disc is determined: After adjustment of the zero position of the measurement circuit of the tri-state encoder is completed, it is specified that numbers 1, 0, and ½ are respectively used to indicate the maximum value $\varepsilon_{rmax}$, the minimum value 0, and an average value $0.5\varepsilon_{rmax}$ of the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$. The number 1 corresponds to the maximum feature height $h_{max}$, and is defined as a full value. The number 0 corresponds to the minimum feature height $h_{min}$, and is defined as a null value. The number ½ corresponds to the average feature height $h_{mid}$, and is defined as a mid-value. The full value, the null value, and the mid-value are together defined as tri-state coded values of the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$, and the tri-state coded values are briefly referred to as tri-state values. When the fluted disc rotates, the tri-state values 0, ½, and 1 cyclically change based on the period T. The cyclic change of the tri-state values is used to determine a rotation status of the fluted disc, in other words, a rotation direction and a rotation angle. The tri-state values have four different combinations in total, as shown in Table 1:

TABLE 1

Combinations of the tri-state values of the strain readings $\varepsilon_{r(R_5, R_6)}$, $\varepsilon_{r(R_7, R_8)}$, $\varepsilon_{r(R_9, R_{10})}$, and $\varepsilon_{r(R_{11}, R_{12})}$

| | $\varepsilon_{r(R_5, R_6)}$ | $\varepsilon_{r(R_7, R_8)}$ | $\varepsilon_{r(R_9, R_{10})}$ | $\varepsilon_{r(R_{11}, R_{12})}$ |
|---|---|---|---|---|
| Combination 1 of the tri-state values | 1 | 0 | ½ | ½ |
| Combination 2 of the tri-state values | 0 | 1 | ½ | ½ |
| Combination 3 of the tri-state values | ½ | ½ | 1 | 0 |
| Combination 4 of the tri-state values | ½ | ½ | 0 | 1 |

TABLE 2

Changes in the tri-state values 0, ½, and 1 in each period T in a process in which the fluted disc 18 clockwise rotates

| | $\varepsilon_{r(R_5, R_6)}$ | $\varepsilon_{r(R_7, R_8)}$ | $\varepsilon_{r(R_9, R_{10})}$ | $\varepsilon_{r(R_{11}, R_{12})}$ |
|---|---|---|---|---|
| (1) 0 to 0.25 T | ↓ 1→½ | ↑ 0→½ | ↑ ½→1 | ↓ ½→0 |
| (2) 0.25 T to 0.5 T | ↓ ½→0 | ↑ ½→1 | ↓ 1→½ | ↑ 0→½ |
| (3) 0.5 T to 0.75 T | ↑ 0→½ | ↓ 1→½ | ↓ ½→0 | ↑ ½→1 |
| (4) 0.75 T to T | ↑ ½→1 | ↓ ½→0 | ↑ 0→½ | ↓ 1→½ |

In the table, "↑" indicates that the tri-state value increases, and "↓" indicates that the tri-state value decreases.

TABLE 3

Changes in the tri-state values 0, ½, and 1 in each period T in a process in which the fluted disc 18 anticlockwise rotates

| | $\varepsilon_{r(R_5, R_6)}$ | $\varepsilon_{r(R_7, R_8)}$ | $\varepsilon_{r(R_9, R_{10})}$ | $\varepsilon_{r(R_{11}, R_{12})}$ |
|---|---|---|---|---|
| (5) 0 to 0.25 T | ↓ 1→½ | ↑ 0→½ | ↓ ½→0 | ↑ ½→1 |
| (6) 0.25 T to 0.5 T | ↓ ½→0 | ↑ ½→1 | ↑ 0→½ | ↓ 1→½ |
| (7) 0.5 T to 0.75 T | ↑ 0→½ | ↓ 1→½ | ↑ ½→1 | ↓ ½→0 |
| (8) 0.75 T to T | ↑ ½→1 | ↓ ½→0 | ↓ 1→½ | ↑ 0→½ |

In the table, "↑" indicates that the tri-state value increases, and "↓" indicates that the tri-state value decreases.

Any combination of the tri-state values is selected from the Table as a starting point for determining the rotation state of the fluted disc. For clarity, the combination 1 of the tri-state values is selected. In this way, each time the fluted disc clockwise rotates by one tooth, the tri-state values complete circulation once within one period T based on Table 2. Each time the fluted disc anticlockwise rotates by one tooth, the tri-state values complete circulation once within one period T based on Table 3. In Table 2 and Table 3, the period T is divided into four ¼ sub-periods. Within each ¼ sub-period, different changes respectively occur on the tri-state values 0, ½, and 1 of the four strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$. Eight rows of data numbered from (1) to (8) are different from one another and unique. Each row of data uniquely indicates a specific rotation state of the fluted disc. For example, a row of data numbered (3) indicates and only indicates that the fluted disc clockwise rotates through a third ¼ of one period T, that is, 0.5 T to 0.75 T. A row of data numbered (5) indicates and only indicates that the fluted disc anticlockwise rotates through a first ¼ of one period T, that is, 0 to 0.25 T. The continuously changing strain readings cooperate with the tri-state values, to play a role of monitoring the rotation state of the fluted disc.

(4) A relative displacement between the left cantilever sensor and the right cantilever sensor is determined: The digital controller is configured to control the driver to operate, so that the left cantilever sensor and the right cantilever sensor move toward each other, until the two respectively abut against the two end surfaces that are the left and right end surfaces of the circular shaft of the segment III-IV on the micro-metering lead screw. A current position of the left cantilever sensor and a current position of the right cantilever sensor are respectively used as displacement origins of the two, and a current position of the fluted disc is recorded as a fluted disc zero position. Alternatively, the left cantilever sensor and the right cantilever sensor are moved to a specified position or any position within a movement range, a current position of the left cantilever sensor and a current position of the right cantilever sensor are used as displacement origins of the two, and a current position of the fluted disc is recorded as a fluted disc zero position. The fluted disc is driven to rotate from the fluted disc zero position, so that the left cantilever sensor and the right cantilever sensor starts from the displacement origins to move towards or away from each other. S is used to indicate the relative displacement between the left cantilever sensor and the right cantilever sensor, is briefly referred to as mobile cantilever displacement, and is calculated by using a formula (2):

$$S = 2t\frac{n_{z,s} - n_{z,n}}{N_c} = 2t\frac{n_z}{N_c}, \quad (2)$$

where in the formula (2), t indicates a lead of the drive lead screw 3, $N_c$ indicates a quantity of teeth of the fluted disc, $n_{z,s}$ indicates an accumulated quantity of teeth by which the fluted disc clockwise rotates from the fluted disc zero position, $n_{z,n}$ indicates an accumulated quantity of teeth by which the fluted disc anticlockwise rotates from the fluted disc zero position, $n_{z,s}$ and $n_{z,n}$ are constantly positive values, $n_z$ indicates a difference between $n_{z,s}$ and $n_{z,n}$, and is defined as an effective quantity of rotation teeth. $n_{z,s}$, $n_{z,n}$, and $n_z$ are also referred to as rotation parameters of the fluted disc. $n_z$ and S are algebraic quantities, when the fluted disc clockwise rotates, the left cantilever sensor and the right cantilever sensor moves away from each other, and symbols of $n_z$ and S are both "+". When the fluted disc anticlockwise rotates, the left cantilever sensor and the right cantilever sensor moves toward each other, and symbols of $n_z$ and S are both "−".

A method and operation steps for measuring a thickness by the measurement host ZJ measurement are as follows:

(1) Adjustment of a zero position of the tri-state encoder: Four half-bridge measurement circuits including the resistance strain gauges [$R_5$, $R_6$], [$R_7$, $R_8$], [$R_9$, $R_{10}$], and [$R_{11}$, $R_{12}$] separately access the digital controller, and the zero position of the measurement circuit of the tri-state encoder (SB) is adjusted based on the foregoing four-step zero position adjustment method.

(2) Setting a reference distance, a displacement origin, and the fluted disc zero position: The positioning block is inserted right above the circular shaft of the segment III-IV on the drive lead screw; the digital controller is configured to control the fluted disc to rotate, and adjust positions of the left cantilever sensor and the right cantilever sensor, and when the two simultaneously abut against the positioning block, the fluted disc stops rotating, and the positioning block is taken down; in this case, a distance between the left holding clipping pin and the right holding clipping pin is the reference distance $S_0$; a status of the dual-acting cantilever sensor with the reference distance of $S_0$ is set, and is defined as a reference state; and in the reference state, a current position of the fluted disc is recorded as the fluted disc zero position, and a current position of the left cantilever sensor and a current position of the right cantilever sensor are respectively recorded as displacement origins thereof.

(3) Calibration of the measurement system: A full-bridge measurement circuit including the resistance strain gauges $R_1$, $R_2$, $R_3$, and $R_4$ accesses the digital controller; two columns of the etalon support BZ are respectively inserted into support positioning slots on front and rear sides of the base plate by using the etalon support positioning keys; the standard block gauges $\delta_1$, $\delta_2$, ..., and $\delta_n$ of the etalon are sequentially inserted into the etalon positioning slot at a top portion of the etalon support by using the etalon positioning key, and the digital controller records corresponding strain readings $\varepsilon_{r1}$, $\varepsilon_{r2}$, ..., and $\varepsilon_{rn}$; $\varepsilon_{r1}$, $\varepsilon_{r2}$, ..., and $\varepsilon_{rn}$ are used as calibration numbers, and the thickness is calculated based on a function relationship between a thickness value $\delta$ and a strain reading $\varepsilon_r$ of the digital controller, in other words, the formula (3);

$$\delta = \frac{\varepsilon_r - B}{A}, \quad (3)$$

where in the formula (3), A and B are constants, and are respectively calculated by using formulas (4) and (5):

$$A = \frac{n\sum_i^n \delta_i \varepsilon_{ri} - \sum_i^n \delta_i \sum_i^n \varepsilon_{ri}}{n\sum_i^n \delta_i^2 - \left(\sum_i^n \delta_i\right)^2}; \text{ and} \quad (4)$$

$$B = \frac{\sum_i^n \varepsilon_{ri} \sum_i^n \delta_i^2 - \sum_i^n \delta_i \sum_i^n \delta_i \varepsilon_{ri}}{n\sum_i^n \delta_i^2 - \left(\sum_i^n \delta_i\right)^2}, \quad (5)$$

where in the formulas (4) and (5), n indicates a quantity of standard block gauges, $\delta_i$ indicates thickness values of standard block gauges with different thicknesses, $\varepsilon_{ri}$ indicates a strain reading corresponding to $\delta_i$, that is, the calibration numbers $\varepsilon_{r1}$, $\varepsilon_{r2}$, . . . , and $\varepsilon_{rn}$; a calibration number corresponding to the reference thickness $\delta_0$ is a reference strain reading, and is indicated by a symbol $\varepsilon_{r0}$.

(4) Measurement: The positioning block is taken from the measurement host, and the two columns of the tested piece support are respectively inserted into the support positioning slots on the two sides that are the front and rear sides of the base plate by using the tested piece support positioning keys; the digital controller is configured to control the fluted disc to rotate, and adjust a vertex distance S between the left holding clipping pin and the right holding clipping pin, so that the vertex distance is greater than the thickness of the tested piece, and the tested piece is placed on the tested piece support, so that two tested surfaces of the tested piece are perpendicular to an axis of the left holding clipping pin and an axis of the right holding clipping pin; S is adjusted again, so that the left holding clipping pin and the right holding clipping pin hold the tested piece, and when strain readings $\varepsilon_r=\varepsilon_{r0}$ or $\varepsilon_r \approx \varepsilon_{r0}$, the fluted disc stops rotating; a thickness of the tested piece is calculated based on the following method and by using the current strain reading $\varepsilon_r$ and the parameters $n_z$, $n_{z,s}$, and $n_{z,n}$ of the fluted disc:

(a) substituting $\varepsilon_r$ into the formula (3), and using $\delta^*$ to indicate a calculation result, that is, $$\delta^* = \frac{\varepsilon_r - B}{A}, \quad (6)$$

where $\delta^*$ indicates a thickness value measured under a condition of a mobile cantilever displacement S=0, and may be referred to as an in-situ thickness. The in-situ thickness $\delta^*$ always corresponds to a determined thickness value;

(b) substituting $n_z$, $n_{z,s}$, and $n_{z,n}$ into the formula (2), to obtain the relative displacement S between the left cantilever sensor and the right cantilever sensor; and (c) substituting $\delta^*$ and S into the formula (7), to obtain the thickness $\delta$ of the tested piece:

$$\delta = \delta^* + S \quad (7).$$

The present invention has the following features:

1. Wide measurement range. Compared with an existing double-cantilever thickness measurement method, the present invention achieves thickness measurement through combined application of the coding lead screw and the dual-acting cantilever sensor, and a range thereof mainly depends on a displacement of a cooperation pair of the micrometering lead screw and the dual-acting cantilever sensor, and is not determined solely by elastic deformation of the cantilever. Therefore, the range can be greatly increased and a thickness 0 can be theoretically measured. A measurement instrument with a wide range may be designed by using the present invention, such as 0 millimeters to 20 millimeters, 0 millimeters to 200 millimeters, 200 millimeters to 500 millimeters, or even a thickness (length) measurement instrument with a larger range.

2. Resolution equal to that of an existing double-cantilever thickness measurement instrument may be achieved. The resolution of the present invention is determined by two aspects of factors: the coding lead screw and the dual-acting cantilever sensor. Under a condition that resolution of the coding lead screw ≤ resolution of the dual-acting cantilever sensor, resolution of the whole machine is determined by the resolution of the dual-acting cantilever sensor. It can be seen that the present invention has a resolution capability equivalent to that of the existing double-cantilever thickness measurement method.

3. Measurement has a flexible property. The formula (7) shows that the thickness value $\delta$ measured by the present invention is an algebraic sum of the in-situ thickness $\delta^*$ and the mobile cantilever displacement $\delta^*$. During the measurement, when the two holding clipping pins holds the tested piece, the digital controller enters an effective display state. In the effective display state, the fluted disc is controlled to rotate at a small angle, so that the strain reading $\varepsilon_r$ changes around the reference strain reading $\varepsilon_{r0}$. It can be seen that although the strain reading $\varepsilon_r$ and the mobile cantilever displacement S are both changing, the thickness value $\delta$ given by the formula (7) remains unchanged. This phenomenon is referred to as "flexible output with equal difference" and is an important property of the present invention. With this property used, the strain reading $\varepsilon_r$ can always be adjusted during the measurement, so that $\varepsilon_r=\varepsilon_{r0}$, and a correct thickness measurement value is obtained. Therefore, at least two advantages may be brought: First, measurement errors caused by sensor nonlinearity are reduced, because $\varepsilon_r=\varepsilon_{r0}$ means that a working point of the cantilever sensor is the same during each measurement, that is, the sensor elastomer has a same bending deformation and strain signal output. Second, it is helpful to control measurement errors caused by contact deformation, because $\varepsilon_r=\varepsilon_{r0}$ means that contact pressure between the holding clipping pin and the tested piece during each measurement is equal to contact pressure between the holding clipping pin and the standard block gauge during calibration.

4. Combination of analog measurement and digital measurement. The measurement host in the present invention mainly includes two basic measurement units: the dual-acting cantilever sensor and the coding lead screw. A strain signal output by the tri-state encoder, the main function component of the coding lead screw, is an analog quantity. After three-level quantization processing by the measurement software of the digital controller, the tri-state coding values 0, ½, and 1 in digital quantities are obtained. Therefore, the present invention has both properties of analog measurement and digital measurement. During the measurement, the digital controller determines a rotation direction and a rotation angle of the fluted disc in real time based on two aspects of condition parameters: first, a rise and fall of strain analog signals output by four half-bridges of the tri-state encoder, that is, alternate progressive increase and progressive decrease of four strain output signals; second, a change in the three-state value, that is, combinations of 8 logic states provided in Table 2 and Table 3. The two aspects of condition parameters have a determined one-to-one correspondence, and cooperate with each other, to ensure correctness and accuracy of displacement measurement by the coding lead screw.

5. A calibration method is simple. The calibration of the measurement apparatus in the present invention is a binary reference transfer process, that is, transfer of a length reference of a lead screw pair and transfer of a length reference of the dual-acting cantilever sensor. The transfer of the length reference of the lead screw pair is ensured by a processing and inspection process of the lead screw pair. When transmission accuracy of the lead screw pair meets requirements, a set of etalons is configured to calibrate the measurement system within a partial range of the full range of the dual-acting cantilever sensor, which can ensure accuracy of full-range measurement. Therefore, an etalon with only one specification needs to be equipped in the present invention, and the apparatus can be calibrated at any time in a use field.

DETAILED DESCRIPTION OF THE INVENTION

The following further describes the present invention with reference to the accompanying drawings.

Figure 1:
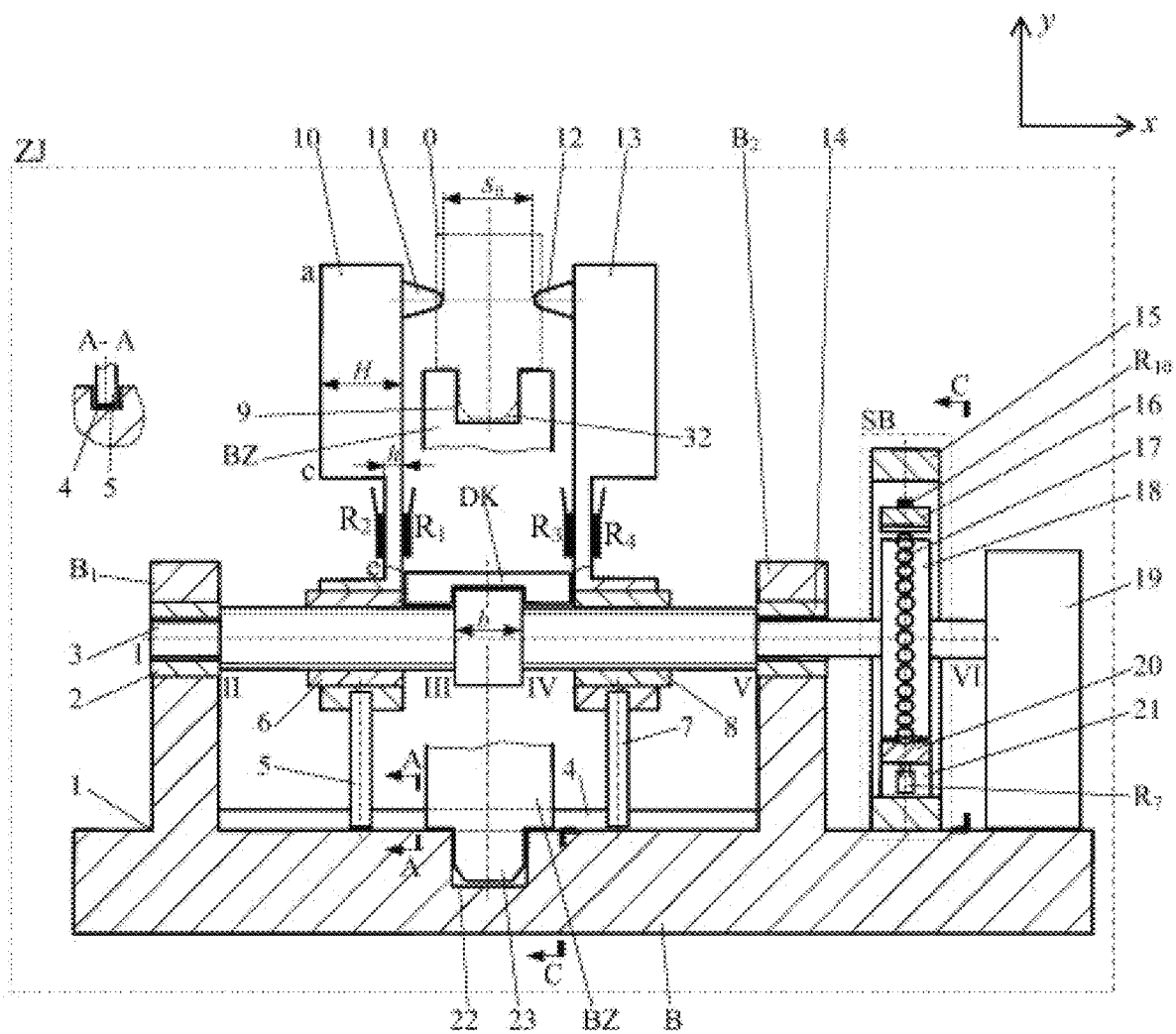
FIG. 1 is a front view of a simplified structural diagram of a measurement apparatus.
Figure 2:
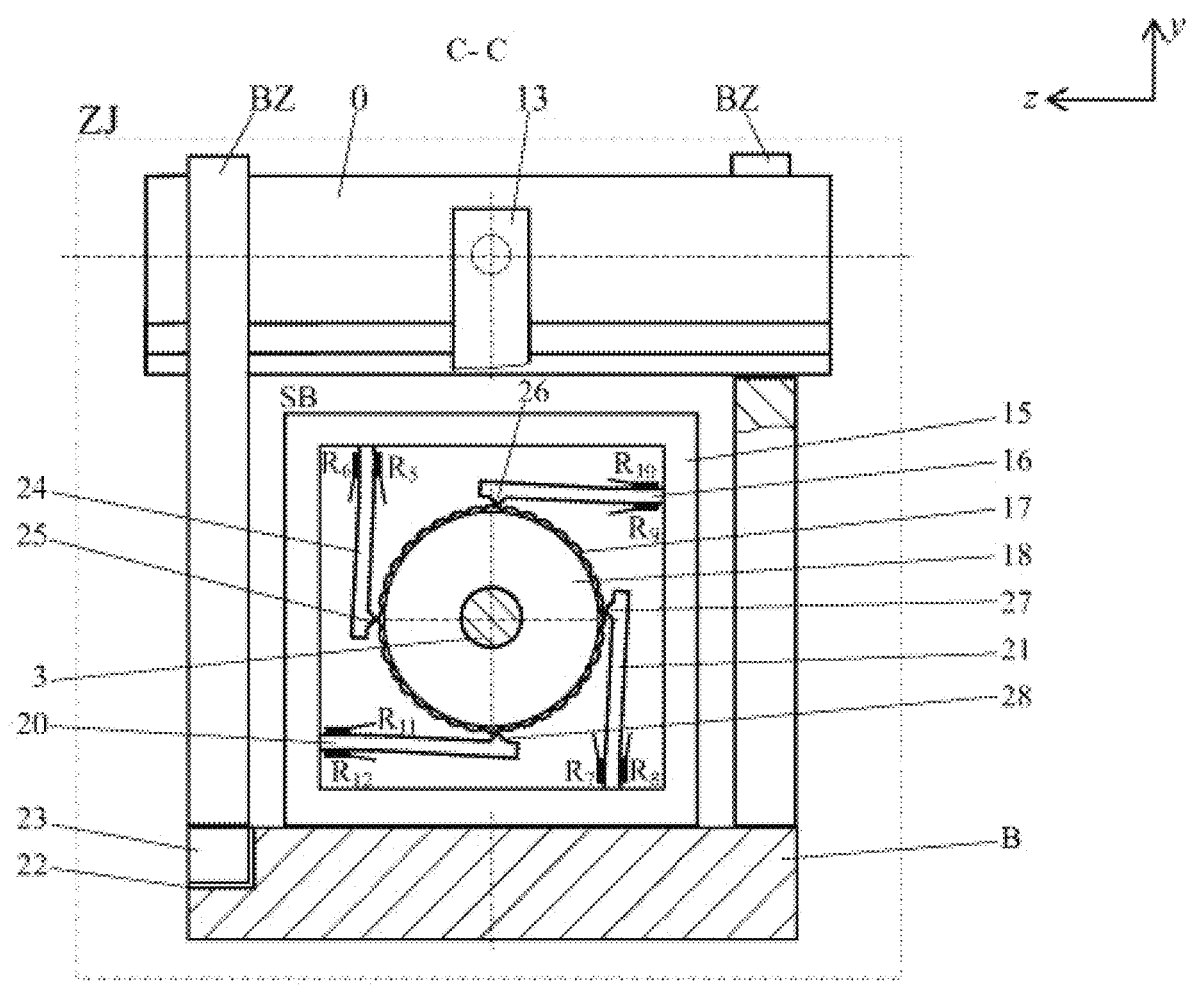
FIG. 2 is a right view of a simplified structural diagram of a measurement apparatus.
Figure 3:
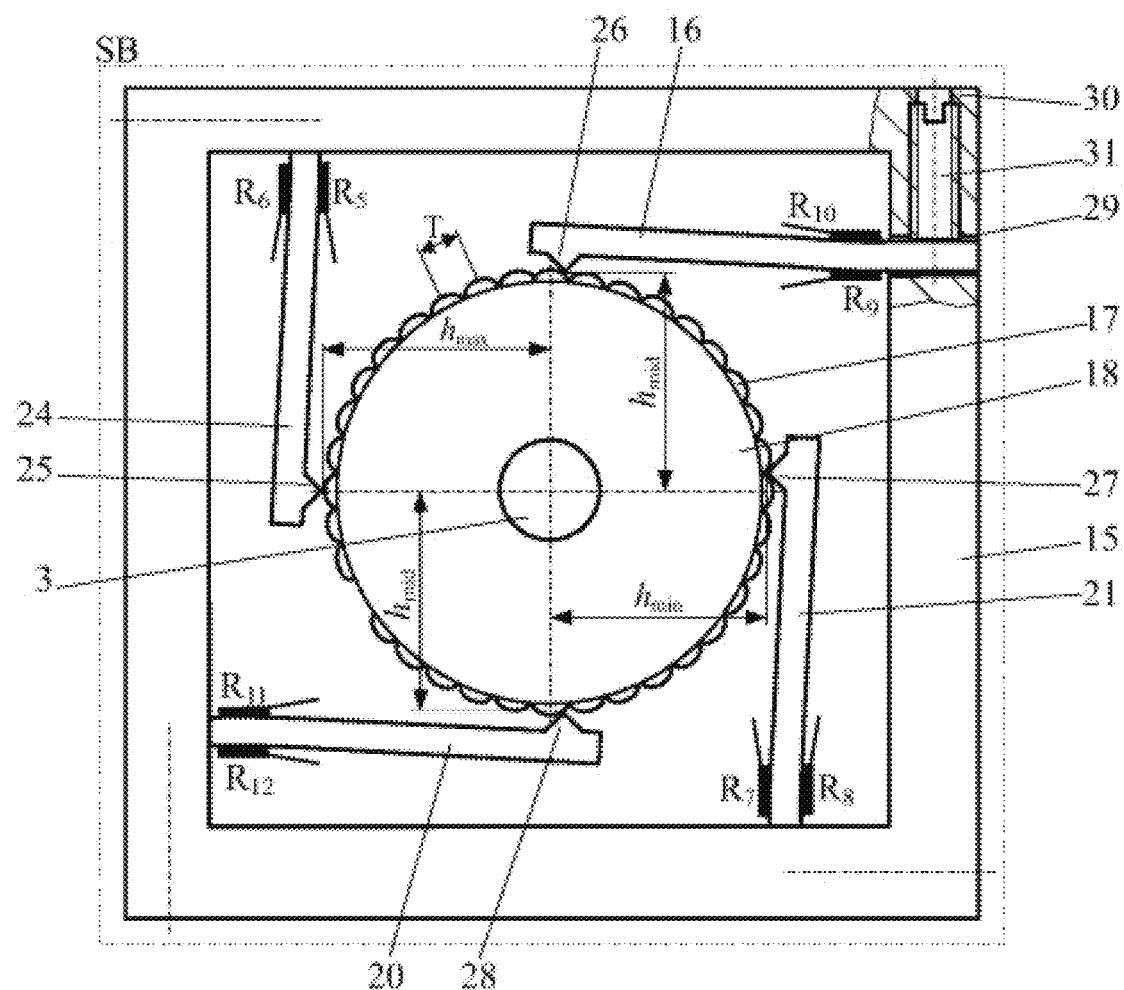
FIG. 3 is a simplified diagram of a structure principle of a tri-state encoder.
Figure 4:
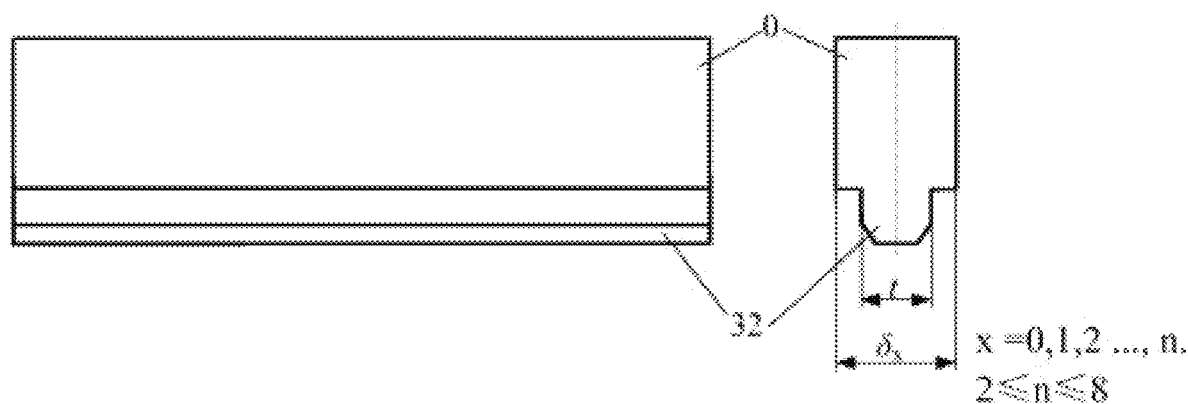
FIG. 4 is a schematic diagram of an etalon, where (a) is a front view, and (b) is a left view.
Figure 5:
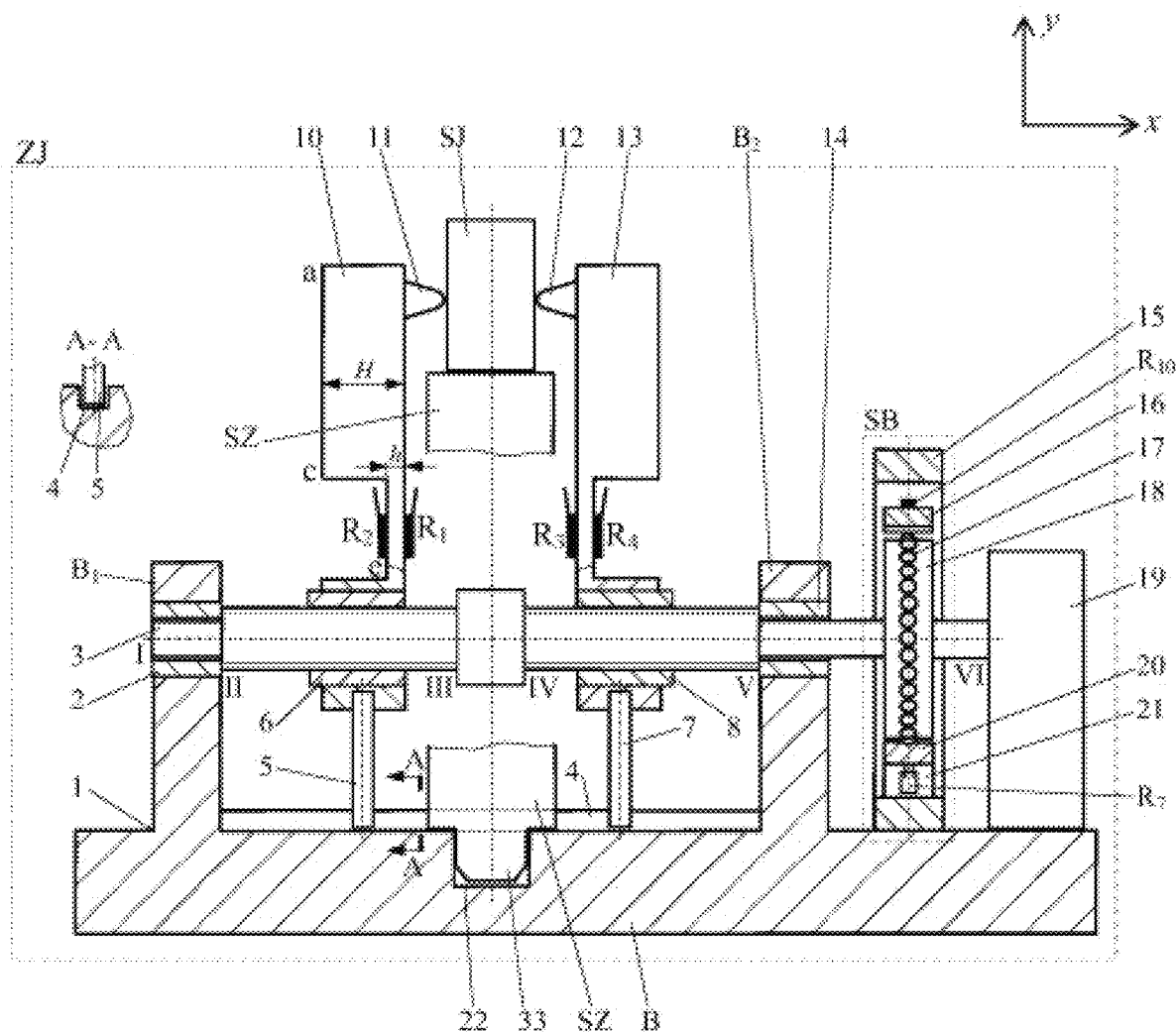
FIG. 5 is a schematic diagram of a measurement apparatus in a measured state.
Figure 6:
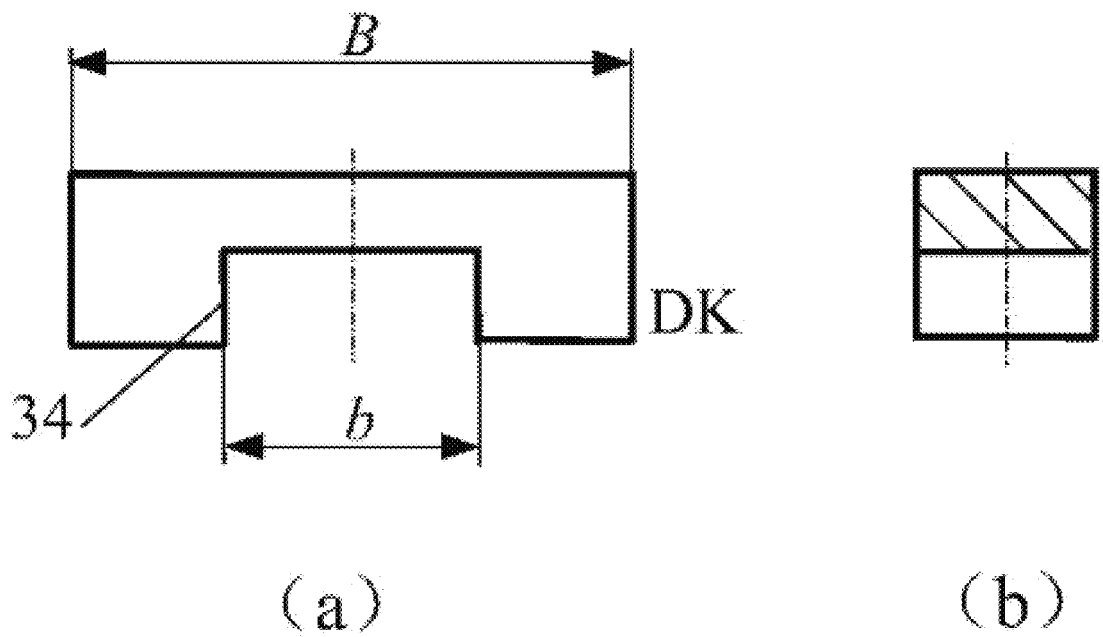
FIG. 6 is a schematic diagram of a positioning block, where (a) is a front view, and (b) is a left view.
Figure 7:
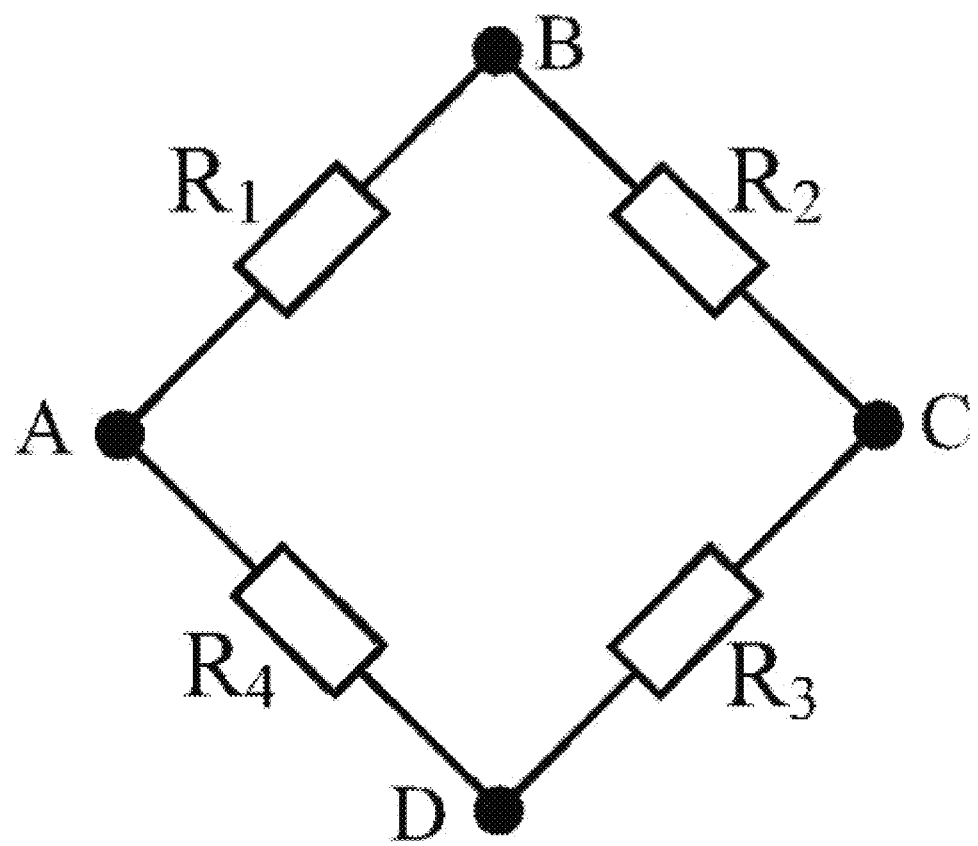
FIG. 7 is a schematic diagram of a full-bridge measurement circuit of a dual-acting cantilever sensor.
Figure 8:
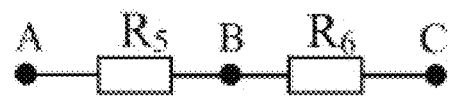
FIG. 8 shows a measurement circuit of a tri-state encoder, where (a) is a half-bridge diagram of resistance strain gauges [$R_5$, $R_6$], (b) is a half-bridge diagram of resistance strain gauges [$R_7$, $R_8$], (c) is a half-bridge diagram of resistance strain gauges [$R_9$, $R_{10}$], and (d) is a half-bridge diagram of resistance strain gauges [$R_{11}$, $R_{12}$]
Figure 8:
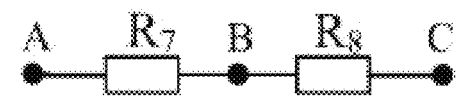
Figure 8:
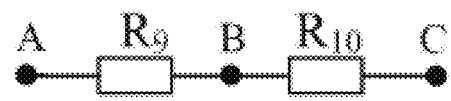
Figure 8:
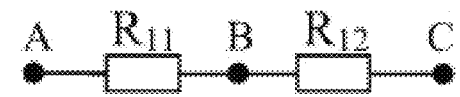
Figure 9:
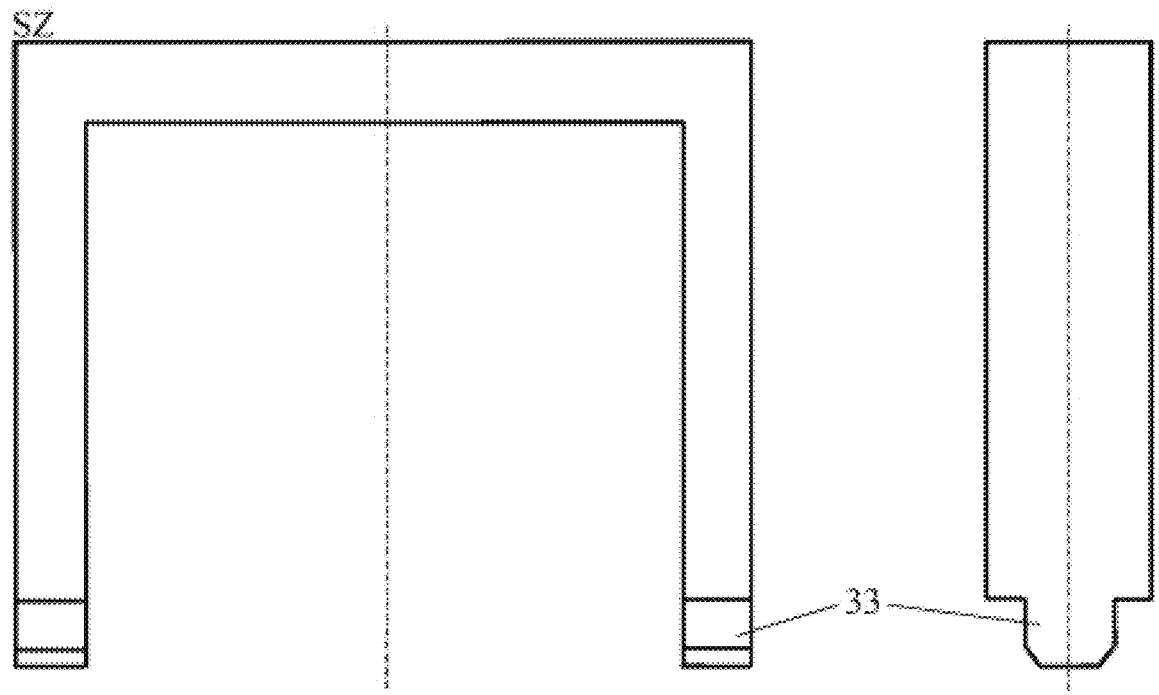
FIG. 9 is a schematic diagram of a tested piece support, where (a) is a front view, and (b) is a left view, where in the figures, 0—etalon, 1—rack, 2—left bearing, 3—micro-metering lead screw, 4—U-shaped guiding limiting slot, 5—left dowel pin, 6—left driving nut, 7—right dowel pin, 8—right driving nut, 9—etalon positioning slot, 10—left cantilever sensor, 11—left holding clipping pin, 12—right holding clipping pin, 13—right cantilever sensor, 14—right bearing, 15—sensor bracket, 16—upper right cantilever sensor, 17—circular arc tooth, 18—fluted disc, 19—driver, 20—lower left cantilever sensor, 21—lower right cantilever sensor, 22—support positioning slot, 23—etalon support positioning key, 24—upper left cantilever sensor, 25—left triangular convex edge, 26—upper triangular convex edge, 27—right triangular convex edge, 28—lower triangular convex edge, 29—rectangular through hole, 30—threaded hole, 31—set screw, 32—etalon positioning key, 33—tested piece support positioning key, 34—slot, ZJ—measurement host, B—base plate, $B_1$—left bearing support plate, $B_2$—right bearing support plate, SB—tri-state encoder, DK—positioning block, SJ—tested piece, BZ—etalon support, and SZ—tested piece support.

Referring to FIG. 1 to FIG. 9, the present invention provides a method and apparatus for thickness measurement. For the method and the apparatus, a measurement host ZJ, an etalon 0, a positioning block DK, a tested piece SJ, an etalon support BZ, a tested piece support SZ, a driver 19, and a digital controller are included, to form a measurement system.

The measurement host ZJ is a basic measurement apparatus of the present invention, and includes a rack 1, a coding lead screw, and a dual-acting cantilever sensor. A structure of the rack 1 includes a base plate B, a left bearing support plate $B_1$ and a right bearing support plate $B_2$ that are fastened on the base plate B, and a support positioning slot 22 is further provided on the base plate B, and is used to mount the etalon support BZ and the tested piece support SZ. The left bearing support plate $B_1$ and the right bearing support plate $B_2$ are parallel to each other, separated on two sides of the support positioning slot 22, and parallel to the support positioning slot 22. One circular through hole is formed on each of the left bearing support plate $B_1$ and the right bearing support plate $B_2$, and a left bearing 2 and a right bearing 14 are respectively embedded into the two circular through holes, and are coaxially positioned. The coding lead screw includes a micro-metering lead screw 3 and a tri-state encoder SB. The micro-metering lead screw 3 is a threaded step shaft, and a structure of the micro-metering lead screw is divided into five segments from left to right: I-II, II-III, III-IV, IV-V, and V-VI, the segment I-II and the segment V-VI are round axles, the segment II-III is a left-hand threaded shaft, the segment IV-V is a right-hand threaded shaft, and the segment III-IV is a circular shaft. The circular shaft of the segment III-IV may also be referred to as a barricade, a diameter of the circular shaft of the segment III-IV is greater than an outer diameter of each of the two threaded shafts, and an outer diameter of each of the two threaded shafts is greater than a diameter of each of the two round axles. The round axle of the segment I-II cooperates with the left bearing 2, the round axle of the segment V-VI cooperates with the right bearing 14, a left end surface of the left-hand threaded shaft of the segment II-III cooperates with a right end surface of the left bearing 2, a right end surface of the right-hand threaded shaft of the segment IV-V cooperates with a left end surface of the right bearing 14, and the four cooperation pairs all take a clearance elimination measure. Therefore, it may be theoretically considered that the micro-metering lead screw 3 only rotates one degree of motion freedom around an axis of the micro-metering lead screw. The tri-state encoder SB is a mechanical-resistance strain displacement sensor, and includes a fluted disc 18, a sensor bracket 15, an upper left cantilever sensor 24, an upper right cantilever sensor 16, a lower left cantilever sensor 20, and a lower right cantilever sensor 21. The fluted disc 18 is provided with circular arc teeth 17, and the fluted disc and the circular arc teeth are coaxially fastened on the round axle of the segment V-VI of the micro-metering lead screw 3, and are located on a right side of the right bearing 14. The circular arc teeth 17 can be formed by inserting steel balls along a circumference of the fluted disc 18, and a quantity of teeth is an integral multiple of 4, such as 128, 256, 360, or 720. The sensor bracket 15 is a rectangular frame fastened on the rack 1, and a rectangular through hole whose axis is parallel to a frame plane and is perpendicular to a side on which the rectangular through hole 29 is located and a threaded hole 30 perpendicularly communicating with the rectangular through hole 29 are sequentially provided at a position near a side corner of each of four sides. The fluted disc 18 is surrounded in the middle by the sensor bracket 15. The upper left cantilever sensor 20, the upper right cantilever sensor 16, the lower left cantilever sensor 20, and the lower right cantilever sensor 21 use constant-section elastic beams or variable-section elastic beams, root portions of the four elastic beams respectively cooperate with the four rectangular through holes 22 on the sensor bracket 15, and the four elastic beams are fastened on an inner wall of an upper side, an inner wall of a lower side, an inner wall of a right side, and an inner wall of a left side of the sensor bracket 15 by using pressing force of the set screw 31. Single-axis resistance strain gauges [$R_5$, $R_6$], [$R_7$, $R_8$], [$R_9$, $R_{10}$], and [$R_{11}$, $R_{12}$] are respectively stuck in a cantilever axis direction at positions near the root portions of the four elastic beams. A left triangular convex edge 25, an upper triangular convex edge 26, a right triangular convex edge 27, and a lower triangular convex edge 28 are respectively provided on a side that faces towards the fluted disc 18 and that is close to free ends of the four elastic beams. All the four elastic beams have certain predeformation, elastic pressure generated through the predeformation enables edge vertexes of the left triangular convex edge 25, the upper triangular convex edge 26, the right triangular convex edge 27, and the lower triangular convex edge 28 to separately come into contact with the circular arc teeth 17 on a periphery of the fluted disc 18, and specific positions of contact points are determined according to the following conditions:

a. It is assumed that a longitudinal symmetric line of the fluted disc 18 just passes through a center of the directly above circular arc tooth 17 and a center of the directly below circular arc tooth 17, and a horizontal symmetric line of the fluted disc 18 just passes through a center of the leftmost circular arc tooth 17 and a center of the rightmost circular arc tooth 17; and b. In this case, the left triangular convex edge 25 is located on the horizontal symmetric line of the fluted disc 18, and just comes into contact with a vertex of the leftmost circular arc tooth 17. The right triangular convex edge 27 is located above the horizontal symmetric line of the fluted disc 18 and the rightmost circular arc tooth 17, and is just aligned with a valley bottom between two adjacent arc teeth 17. The upper triangular convex edge 26 and the lower triangular convex edge 28 are both located on a right side of the longitudinal symmetric line of the fluted disc 18, and respectively come into contact with a right side of the directly above circular arc tooth 17 and a right side of the directly below circular arc tooth 17. A distance from the left triangular convex edge 25 to the longitudinal symmetric line of the fluted disc 18 is indicated by $h_{max}$, a distance from the right triangular convex edge 24 to the longitudinal symmetric line of the fluted disc 18 is indicated by $h_{min}$, a distance from a contact point between the upper triangular convex edge 26 and the directly above circular arc tooth 17 to the horizontal symmetric line of the fluted disc 18 is indicated by $h_{mid}$, and a distance from a contact point between the lower triangular convex edge 28 and the directly below circular arc tooth 17 to the horizontal symmetric line of the fluted disc 18 is also indicated by $h_{mid}$. A relationship indicated by a formula (1) exists among $h_{mid}$, $h_{min}$, and $h_{max}$:

$$h_{mid} = \frac{h_{min} + h_{max}}{2}. \tag{1}$$

$h_{min}$, $h_{mid}$, and $h_{max}$, are referred to as feature heights, $h_{min}$ is a minimum feature height, $h_{mid}$ is an average feature height, and $h_{max}$ is a maximum feature height. The dual-acting cantilever sensor includes a left cantilever sensor 10 and a right cantilever sensor 13, and the two have a same structure and size. The structure of the left cantilever sensor 10 includes a variable-section elastic beam, a left holding clipping pin 11 fastened on a right side of a free end of the elastic beam, single-axis resistance strain gauges [$R_1$, $R_2$] stuck on left and right sides near a root portion of the cantilever, a left driving nut 6 embedded into the root portion of the cantilever, and a left dowel pin 5 fastened at a bottom portion of the cantilever, and the left cantilever sensor 10 is mounted on the rack 1 through cooperation between the left driving nut 6 and the left-hand threaded shaft of the segment II-III on the micro-metering lead screw 3 and cooperation between the left dowel pin 5 and a U-shaped guiding limiting slot 4. The structure of the right cantilever sensor 13 includes a variable-section elastic beam, a right holding clipping pin 12 fastened on a left side of the free end of the elastic beam, single-axis resistance strain gauges [$R_3$, $R_4$] stuck on left and right sides near the root portion of the cantilever, a right driving nut 8 embedded into the root portion of the cantilever, and a right dowel pin 7 fastened at the bottom portion of the cantilever, and the right cantilever sensor 13 is mounted on the rack 1 through cooperation between the right driving nut 8 and the right-hand threaded shaft of the segment IV-V on the micro-metering lead screw 3 and cooperation between the right dowel pin 7 and the U-shaped guiding limiting slot 4. Cooperation between the left dowel pin 5 and the U-shaped guiding limiting slot 4 and cooperation between the right dowel pin 7 and the U-shaped guiding limiting slot 4 enable the left cantilever sensor 10 and the right cantilever sensor 13 to be incapable of rotation, and to be capable of only horizontal movement, and when the drive lead screw 3 rotates, the left cantilever sensor 10 and the right cantilever sensor 13 are driven to move towards or away from each other along an axis of the micro-metering lead screw 3. A cooperation pair of the left driving nut 6 and the micro-metering lead screw 3 and a cooperation pair of the right driving nut 8 and the micro-metering lead screw 3 both use a clearance elimination measure, it is theoretically considered that a degree of motion freedom of the micro-metering lead screw 3 in a plane x-y is zero, and when the micro-metering lead screw 3 changes a rotation direction, the left driving nut 6 and the right driving nut 8 can be driven to change a movement direction without hysteresis. The variable-section elastic beam of the left cantilever sensor 10 and the variable-section elastic beam of the right cantilever sensor 13 both have a same shape, size, and material, a cross section of a beam is rectangular, two segments that are a rigid segment ac and a flexible segment ce are obtained through division from a free end a to a root portion e, the rigid segment ac has a same width as the flexible segment ce, and a height H of the rigid segment ac is greater than a height h of the flexible segment ce. The left cantilever sensor 10 and the right cantilever sensor 13 are symmetrically positioned, and free ends of the two are vertically upward. The left holding clipping pin 11 and the right holding clipping pin 12 are coaxially positioned, and a vertex distance between the two is indicated by s. The resistance strain gauges $R_1$, $R_2$, $R_3$, and $R_4$ constitute a full-bridge measurement circuit, and a strain signal generated by the circuit is indicated by $\varepsilon_r$.

The etalon 0 includes several standard block gauges, and an etalon positioning key 32 is provided beneath the standard block gauge. Thickness values of the standard block gauges are sequentially denoted by $\delta_1, \delta_2, \ldots,$ and $\delta_n$. $\delta_1, \delta_2, \ldots,$ and $\delta_n$ are also used to denote standard block gauges with different thicknesses. The thickness values of the standard block gauges are arranged in an order of $\delta_1 < \delta_2, \ldots, < \delta_n$, where $n \geq 2$, indicating a quantity of the standard block gauges. Thicknesses of etalon positioning keys 32 of the standard block gauges are equal, and are indicated by t. Any one of the standard block gauges is selected, and is defined as a reference gauge, and a thickness value of the reference gauge is defined as a reference thickness, and is indicated by $\delta_0$. An arithmetic mean of $\delta_1, \delta_2, \ldots, \delta_n$ is indicated by $\bar{\delta}$.

The positioning block DK is a block whose lower portion is provided with a slot 34, the slot 34 is used to cooperate with left and right end surfaces of the circular shaft of the segment III-IV on the micro-metering lead screw 3, and a width of the slot has a same nominal size as a length of the circular shaft of the segment III-IV on the micro-metering lead screw. A condition for determining a length of the positioning block DK is as follows: The positioning block DK is inserted into a top portion of the circular shaft of the segment III-IV, and a right side surface of a root portion of the left cantilever sensor 10 and a left side surface of a root portion of the right cantilever sensor 13 respectively abut against the two end surfaces that are the left and right end surfaces in a length direction of the positioning block DK; in this way, a distance $S_0$ between the left holding clipping pin 11 and the right holding clipping pin 12 is less than a minimum thickness value $\delta_1$ of the etalon, in other words, $S_0 < \delta_1$. $S_0$ is defined as a reference distance of the dual-acting cantilever sensor, and is briefly referred to as a reference distance.

The tested piece 10 is a plate sample for a material mechanical property test, a curved section sample, or another rigid mechanical part whose thickness needs to be measured;

The etalon support BZ includes two columns that are front and rear columns having a same shape and size, a top portion of the column is provided with an etalon positioning slot 9, and a bottom portion of the column is provided with an etalon support positioning key 23. A nominal width of the etalon positioning slot 9 is equal to a nominal thickness t of the etalon positioning key 32 on the standard block gauge. The etalon support positioning key 23 has the same nominal width as the support positioning slot 22. When the etalon support positioning key 23 is inserted into the support positioning slot 22, a longitudinal symmetric plane of the etalon positioning slot 9 coincides with a longitudinal symmetric plane of the left holding clipping pin 11 and a longitudinal symmetric plane of the right holding clipping pin 12.

The tested piece support SZ is of a "Π"-shaped structure, an upper portion of the tested piece support is a platform or a platform surface of another shape processed according to geometric parameters of the tested piece SJ, and the two columns that are the front and rear columns that have the same shape and size are provided below the tested piece support; a tested piece support positioning key 33 is provided at a bottom portion of the column.

The driver 19 is a stepper motor, or is a driving mechanism including a motor and a transmission such as a worm-gear or a gear train.

The digital controller (not shown in the figure) is a microcomputer system including a strain signal collection-conditioning circuit, a driver control circuit, and measurement software; the measurement software is designed and implemented according to the following measurement method and idea. The digital controller cooperates with the coding lead screw, the dual-acting cantilever sensor, and the driver 19, to implement close-loop control on the measurement system. There are three basic ways of forming the digital controller. 1. The digital controller is designed as a special supporting instrument for the thickness measurement apparatus. 2. Thickness measurement software compiled according to the present invention is added to the digital controller by using an ordinary virtual measurement instrument with a resistance strain test function. 3. The measurement apparatus in the present invention is integrated with a test device or production device such as a material test machine, and thickness measurement software is added to a digital control system of the test machine or another device.

A mechanism combining the coding lead screw and the dual-acting cantilever sensor works in the following manner:

(1) Connection of measurement circuits of the tri-state encoder: Resistance strain gauges $[R_5, R_6]$, $[R_7, R_8]$, $[R_9, R_{10}]$, and $[R_{11}, R_{12}]$ separately access the digital controller in a half-bridge manner, and $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ are respectively used to indicate strain readings of the four half-bridge measurement circuits measured by the digital controller.

(2) Adjustment of a zero position of the measurement circuit of the tri-state encoder: The digital controller is configured to control the driver 19 to operate, to drive the fluted disc 18 to rotate, the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ measured by the digital controller accordingly periodically change continuously, a change period is denoted by T, and T also denotes a tooth vertex distance between two adjacent circular arc teeth 17 on the fluted disc 18. Each time the fluted disc 18 rotates by one tooth, in other words, one period T, the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ separately complete circulation once. A change in $\varepsilon_{r(R_5,R_6)}$ is tracked and observed, and when $\varepsilon_{r(R_5,R_6)}$ reaches a minimum value $\varepsilon_{rmin}$, the fluted disc 1 stops rotating, and the digital controller 19 is configured to adjust a balanced circuit of a bridge on which the resistance strain gauges $[R_5, R_6]$ are located, so that the resistance strain gauges reach a balanced state, in other words, $\varepsilon_{r(R_5,R_6)}=0$. The foregoing actions are repeated, and when $\varepsilon_{r(R_7,R_8)}$, $\varepsilon_{r(R_9,R_{10})}$, and $\varepsilon_{r(R_{11},R_{12})}$ reaches the minimum value $\varepsilon_{rmin}$ balanced circuits of bridges on which the resistance strain gauges $[R_7, R_8]$, $[R_9, R_{10}]$, and $[R_{11}, R_{12}]$ are located are sequentially adjusted, so that $\varepsilon_{r(R_7,R_8)}$, $\varepsilon_{r(R_9,R_{10})}$, and $\varepsilon_{r(R_{11},R_{12})}=0$. After zero positions of four half-bridge measurement circuits are adjusted, the fluted disc 18 rotates, and in this way, the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ all cyclically change between a minimum value 0 and a maximum value $\varepsilon_{rmax}$, the minimum value 0 corresponds to a valley bottom position between two adjacent circular arc teeth 17 over against the left triangular convex edge 25, the upper triangular convex edge 26, the right triangular convex edge 27, or the lower triangular convex edge 28, in other words, corresponds to the minimum feature height $h_{min}$, and the maximum value $\varepsilon_{rmax}$ corresponds to a position at which the left triangular convex edge 25, the upper triangular convex edge 26, the right triangular convex edge 27, or the lower triangular convex edge 28 comes into contact with a vertex of the circular arc tooth 17, in other words, corresponds to the maximum feature height $h_{max}$. The foregoing method for adjusting the zero position of the measurement circuit of the tri-state encoder SB is referred to as a four-step zero position adjustment method.

(3) A relationship between a strain reading and a rotation status of the fluted disc is determined: After adjustment of the zero position of the measurement circuit of the tri-state encoder is completed, it is specified that numbers 1, 0, and ½ are respectively used to indicate the maximum value $\varepsilon_{rmax}$, the minimum value 0, and an average value $0.5\varepsilon_{rmax}$ of the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$. The number 1 corresponds to the maximum feature height $h_{max}$, and is defined as a full value. The number 0 corresponds to the minimum feature height $h_{min}$, and is defined as a null value. The number ½ corresponds to the average feature height $h_{mid}$, and is defined as a mid-value. The full value, the null value, and the mid-value are together defined as tri-state coded values of the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$, and the tri-state coded values are briefly referred to as tri-state values. When the fluted disc rotates, the tri-state values 0, ½, and 1 cyclically change based on the period T. The cyclic change of the tri-state values is used to determine a rotation status of the fluted disc, in other words, a rotation direction and a rotation angle. The tri-state values have four different combinations in total, as shown in Table 1:

TABLE 1

Combinations of the tri-state values of the strain readings $\varepsilon_{r(R_5, R_6)}$, $\varepsilon_{r(R_7, R_8)}$, $\varepsilon_{r(R_9, R_{10})}$ and $\varepsilon_{r(R_{11}, R_{12})}$

| | $\varepsilon_{r(R_5, R_6)}$ | $\varepsilon_{r(R_7, R_8)}$ | $\varepsilon_{r(R_9, R_{10})}$ | $\varepsilon_{r(R_{11}, R_{12})}$ |
|---|---|---|---|---|
| Combination 1 of the tri-state values | 1 | 0 | ½ | ½ |
| Combination 2 of the tri-state values | 0 | 1 | ½ | ½ |
| Combination 3 of the tri-state values | ½ | ½ | 1 | 0 |
| Combination 4 of the tri-state values | ½ | ½ | 0 | 1 |

TABLE 2

Changes in the tri-state values 0, ½, and 1 in each period T in a process in which the fluted disc 18 clockwise rotates

| | $\varepsilon_{r(R_5, R_6)}$ | $\varepsilon_{r(R_7, R_8)}$ | $\varepsilon_{r(R_9, R_{10})}$ | $\varepsilon_{r(R_{11}, R_{12})}$ |
|---|---|---|---|---|
| (1) 0 to 0.25 T | ↓ 1→½ | ↑ 0→½ | ↑ ½→1 | ↓ ½→0 |
| (2) 0.25 T to 0.5 T | ↓ ½→0 | ↑ ½→1 | ↓ 1→½ | ↑ 0→½ |
| (3) 0.5 T to 0.75 T | ↑ 0→½ | ↓ 1→½ | ↓ ½→0 | ↑ ½→1 |
| (4) 0.75 T to T | ↑ ½→1 | ↓ ½→0 | ↑ 0→½ | ↓ 1→½ |

In the table, "↑" indicates that the tri-state value increases, and "↓" indicates that the tri-state value decreases.

TABLE 3

Changes in the tri-state values 0, ½, and 1 in each period T in a process in which the fluted disc 18 anticlockwise rotates

| | $\varepsilon_{r(R_5, R_6)}$ | $\varepsilon_{r(R_7, R_8)}$ | $\varepsilon_{r(R_9, R_{10})}$ | $\varepsilon_{r(R_{11}, R_{12})}$ |
|---|---|---|---|---|
| (5) 0 to 0.25 T | ↓ 1→½ | ↑ 0→½ | ↓ ½→0 | ↑ ½→1 |
| (6) 0.25 T to 0.5 T | ↓ ½→0 | ↑ ½→1 | ↑ 0→½ | ↓ 1→½ |
| (7) 0.5 T to 0.75 T | ↑ 0→½ | ↓ 1→½ | ↑ ½→1 | ↓ ½→0 |
| (8) 0.75 T to T | ↑ ½→1 | ↓ ½→0 | ↓ 1→½ | ↑ 0→½ |

In the table, "↑" indicates that the tri-state value increases, and "↓" indicates that the tri-state value decreases.

Any combination of the tri-state values is selected from the Table 1 as a starting point for determining the rotation state of the fluted disc. For clarity, the combination 1 of the tri-state values is selected. In this way, each time the fluted disc clockwise rotates by one tooth, the tri-state values complete circulation once within one period T based on Table 2. Each time the fluted disc anticlockwise rotates by one tooth, the tri-state values complete circulation once within one period T based on Table 3. In Table 2 and Table 3, the period T is divided into four ¼ sub-periods. Within each ¼ sub-period, different changes respectively occur on the tri-state values 0, ½, and 1 of the four strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$. Eight rows of data numbered from (1) to (8) are different from one another and unique. Each row of data uniquely indicates a specific rotation state of the fluted disc. For example, a row of data numbered (3) indicates and only indicates that the fluted disc clockwise rotates through a third ¼ of one period T, that is, 0.5 T to 0.75 T. A row of data numbered (5) indicates and only indicates that the fluted disc anticlockwise rotates through a first ¼ of a period T, that is, 0 to 0.25 T. The continuously changing strain readings cooperate with the tri-state value, to play a role of monitoring the rotation state of the fluted disc.

(4) A relative displacement between the left cantilever sensor and the right cantilever sensor is determined: The digital controller 19 is configured to control the driver to operate, so that the left cantilever sensor 10 and the right cantilever sensor 13 move toward each other, until the two respectively abut against the two end surfaces that are the left and right end surfaces of the circular shaft of the segment III-IV on the micro-metering lead screw 3. A current position of the left cantilever sensor 10 and a current position of the right cantilever sensor 13 are respectively used as displacement origins of the two, and a current position of the fluted disc 18 is recorded as a fluted disc zero position. Alternatively, the left cantilever sensor 10 and the right cantilever sensor 13 are moved to a specified position or any position within a movement range, a current position of the left cantilever sensor 10 and a current position of the right cantilever sensor 13 are used as displacement origins of the two, and a current position of the fluted disc 18 is recorded as a fluted disc zero position. The fluted disc 18 is driven to rotate from the fluted disc zero position, so that the left cantilever sensor 10 and the right cantilever sensor 13 starts from the displacement origins to move towards or away from each other. S is used to indicate mobile cantilever displacement, and is calculated by using a formula (2):

$$S = 2t\frac{n_{z,s} - n_{z,n}}{N_c} = 2t\frac{n_z}{N_c}, \tag{2}$$

where in the formula (2), t indicates a lead of the drive lead screw 3, Nc indicates a quantity of teeth of the fluted disc 18, $n_{z,s}$ indicates an accumulated quantity of teeth by which the fluted disc 18 clockwise rotates from the zero position of the fluted disc, $n_{z,n}$ indicates an accumulated quantity of teeth by which the fluted disc 18 anticlockwise rotates from the zero position of the fluted disc, $n_{z,s}$ and $n_{z,n}$ are constantly positive values, and $n_z$ indicates a difference between $n_{z,s}$ and $n_{z,n}$, and is defined as an effective quantity of rotation teeth. $n_{z,s}$, $n_{z,n}$, and $n_z$ are also referred to as rotation parameters of the fluted disc. $n_z$ and S are algebraic quantities, when the fluted disc 18 clockwise rotates, the left cantilever sensor 10 and the right cantilever sensor 13 moves away from each other, and symbols of $n_z$ and S are both "+". When the fluted disc 18 anticlockwise rotates, the left cantilever sensor 10 and the right cantilever sensor 13 moves toward each other, and symbols of $n_z$ and S are both "–".

A method and operation steps for measuring a thickness by the measurement host ZJ measurement are as follows:

(1) Adjustment of a zero position of the tri-state encoder: Four half-bridge measurement circuits including the resistance strain gauges [$R_5$, $R_6$], [$R_7$, $R_8$], [$R_9$, $R_{10}$], and [$R_{11}$, $R_{12}$] separately access the digital controller, and the zero position of the measurement circuit of the tri-state encoder (SB) is adjusted based on the foregoing four-step zero position adjustment method.

(2) Setting a reference distance, a displacement origin, and the fluted disc zero position: The positioning block DK is inserted right above the circular shaft of the segment III-IV on the drive lead screw 3; the digital controller is configured to control the fluted disc 18 to rotate, and adjust positions of the left cantilever sensor 10 and the right cantilever sensor 13, and when the two simultaneously abut against the positioning block DK, the fluted disc 18 stops rotating, and the positioning block DK is taken down; in this case, a distance between the left holding clipping pin 11 and the right holding clipping pin 12 is the reference distance $S_0$; a status of the dual-acting cantilever sensor with the reference distance of $S_0$ is set, and is defined as a reference state; and in the reference state, a current position of the fluted disc 18 is recorded as the fluted disc zero position, and a current position of the left cantilever sensor 10 and a current position of the right cantilever sensor 13 are respectively recorded as displacement origins thereof;

(3) Calibration of the measurement system: A full-bridge measurement circuit including the resistance strain gauges $R_1$, $R_2$, $R_3$, and $R_4$ accesses the digital controller; two columns of the etalon support BZ are respectively inserted into support positioning slots 22 on front and rear sides of the base plate B by using the etalon support positioning keys 23; the standard block gauges $\delta_1, \delta_2, \ldots,$ and $\delta_n$ of the etalon 0 are sequentially inserted into the etalon positioning slot 9 at a top portion of the etalon support BZ by using the etalon positioning key 32, and the digital controller records the corresponding readings $\varepsilon_{r1}, \varepsilon_{r2}, \ldots,$ and $\varepsilon_{rn}$. $\varepsilon_{r1}, \varepsilon_{r2}, \ldots,$ and $\varepsilon_{rn}$ are used as calibration numbers, and the thickness is calculated based on a function relationship between a thickness value $\delta$ and a strain reading $\varepsilon_r$ of the digital controller, in other words, the formula (3);

$$\delta = \frac{\varepsilon_r - B}{A}, \quad (3)$$

where in the formula (3), A and B are constants, and are respectively calculated by using formulas (4) and (5):

$$A = \frac{n\sum_i^n \delta_i \varepsilon_{ri} - \sum_i^n \delta_i \sum_i^n \varepsilon_{ri}}{n\sum_i^n \delta_i^2 - \left(\sum_i^n \delta_i\right)^2}; \text{ and} \quad (4)$$

$$B = \frac{\sum_i^n \varepsilon_{ri} \sum_i^n \delta_i^2 - \sum_i^n \delta_i \sum_i^n \delta_i \varepsilon_{ri}}{n\sum_i^n \delta_i^2 - \left(\sum_i^n \delta_i\right)^2}, \quad (5)$$

where in the formulas (4) and (5), n indicates a quantity of standard block gauges, $\delta_i$ indicates thickness values of standard block gauges with different thicknesses, $\varepsilon_{ri}$ indicates a strain reading corresponding to $\delta_i$, that is, the calibration numbers $\varepsilon_{r1}, \varepsilon_{r2}, \ldots,$ and $\varepsilon_{rn}$; a calibration number corresponding to the reference thickness $\delta_0$ is a reference strain reading, and is denoted by a symbol $\varepsilon_{r0}$.

(4) Measurement: The positioning block DK is taken from the measurement host ZJ, and the two columns of the tested piece support SZ are respectively inserted into the support positioning slots 22 on the two sides that are the front and rear sides of the base plate B by using the tested piece support positioning keys 33; the digital controller is configured to control the fluted disc 18 to rotate, and adjust a vertex distance s between the left holding clipping pin 11 and the right holding clipping pin 12, so that the vertex distance is greater than the thickness of the tested piece SJ, and the tested piece SJ is placed on the tested piece support SZ, so that two tested surfaces of the tested piece SJ are perpendicular to an axis of the left holding clipping pin 11 and an axis of the right holding clipping pin 12; S is adjusted again, so that the left holding clipping pin 11 and the right holding clipping pin 12 hold the tested piece SJ, and when strain readings $\varepsilon_r = \varepsilon_{r0}$ or $\varepsilon_r \approx \varepsilon_{r0}$, the fluted disc 18 stops rotating; a thickness of the tested piece SJ is calculated based on the following method and by using the current strain reading $\varepsilon_r$ and the parameters $n_z$, $n_{z,s}$, and $n_{z,n}$ of the fluted disc:

(a) substituting $\varepsilon_r$ into the formula (3), and using $\delta^*$ to indicate a calculation result, that is, $$\delta^* = \frac{\varepsilon_r - B}{A} \quad (6)$$

(b) substituting $n_z$, $n_{z,s}$, and $n_{z,n}$ into the formula (2), to obtain the relative displacement S between the left cantilever sensor 10 and the right cantilever sensor 13; and (c) substituting $\delta^*$ and S into the formula (7), to obtain the thickness $\delta$ of the tested piece SJ:

$$\delta = \delta^* + S \quad (7).$$

Algorithm design of the measurement software is performed based on construction, the working principle, and a measurement method of the measurement system described above.

What is claimed is:

1. A thickness measurement apparatus, wherein the apparatus comprises a measurement host (ZJ), an etalon (0), a positioning block (DK), a tested piece (SJ), an etalon support (BZ), a tested piece support (SZ), a driver (19), and a digital controller, to form a measurement system;

the measurement host (ZJ) comprises a rack (1), a coding lead screw, and a dual-acting cantilever sensor; a structure of the rack (1) comprises a base plate (B), a left bearing support plate ($B_1$) and a right bearing support plate ($B_2$) that are fastened on the base plate (B), and a support positioning slot (22) is provided on the base plate (B); the left bearing support plate ($B_1$) and the right bearing support plate ($B_2$) are parallel to each other, separated on two sides of the support positioning slot (22), and parallel to the support positioning slot (22); one circular through hole is formed on each of the left bearing support plate ($B_1$) and the right bearing support plate ($B_2$), and a left bearing (2) and a right bearing (14) are respectively embedded into the two circular through holes, and are coaxially positioned; the coding lead screw comprises a micro-metering lead screw (3) and a tri-state encoder (SB); the micro-metering lead screw (3) is a threaded step shaft, and a structure of the micro-metering lead screw (3) is divided into five segments from left to right: I-II, II-III, III-IV, IV-V, and V-VI, the segment I-II and the segment V-VI are round axles, the segment II-III is a left-hand threaded shaft, the segment IV-V is a right-hand threaded shaft, the segment III-IV is a circular shaft, a diameter of the circular shaft of the segment III-IV is greater than an outer diameter of each of the two threaded shafts, the outer diameter of each of the two threaded shafts is greater than a diameter of each of the two round axles, the round axle of the segment I-II cooperates with the left bearing (2), and the round axle of the segment V-VI cooperates with the right bearing (14); the tri-state encoder (SB) comprises a fluted disc (18), a sensor bracket (15), an upper left cantilever sensor (24), an upper right cantilever sensor (16), a lower left cantilever sensor (20), and a lower right cantilever sensor (21); the fluted disc (18) is provided with several circular arc teeth (17) that are circumferentially and uniformly distributed, and the fluted disc (18) and the circular arc teeth (17) are coaxially fastened on the round axle of the segment V-VI of the micro-metering lead screw (3), and are located on a right side of the right bearing (14); the sensor bracket (15) is a rectangular frame fastened on the rack (1), and a rectangular through hole (29) whose axis is parallel to a frame plane and is perpendicular to a side on which the rectangular through hole (29) is located and a threaded hole (30) perpendicularly communicating with the rectangular through hole (29) are sequentially provided at a position near a side corner of each of four sides; the fluted disc (18) is surrounded in the middle by the sensor bracket (15); the upper left cantilever sensor (24), the upper right cantilever sensor (16), the lower left cantilever sensor (20), and the lower right cantilever sensor (21) use constant-section elastic beams or variable-section elastic beams, root portions of the four elastic beams respectively cooperate with the four rectangular through holes (29) on the sensor bracket (15), and the four elastic beams are fastened on an inner wall of an upper side, an inner wall of a right side, an inner wall of a left side, and an inner wall of a lower side of the sensor bracket (15) by using pressing force of the set screw (31); single-axis resistance strain gauges [$R_5$, $R_6$], [$R_7$, $R_8$], [$R_9$, $R_{10}$], and [$R_{11}$, $R_{12}$] are respectively stuck in a cantilever axis direction at positions near the root portions of the four elastic beams; a left triangular convex edge (25), an upper triangular convex edge (26), a right triangular convex edge (27), and a lower triangular convex edge (28) are respectively provided on a side that faces towards the fluted disc (18) and that is close to free ends of the four elastic beams; all the four elastic beams have certain predeformation, elastic pressure generated through the predeformation enables edge vertexes of the left triangular convex edge (25), the upper triangular convex edge (26), the right triangular convex edge (27), and the lower triangular convex edge (28) to separately come into contact with the circular arc teeth (17) on a periphery of the fluted disc (18), and specific positions of contact points are determined according to the following conditions:

a. it is assumed that a longitudinal symmetric line of the fluted disc (18) just passes through a center of the directly above circular arc tooth (17) and a center of the directly below circular arc tooth (17), and a horizontal symmetric line of the fluted disc (18) just passes through a center of the leftmost circular arc tooth (17) and a center of the rightmost circular arc tooth (17); and b. in this case, the left triangular convex edge (25) is located on the horizontal symmetric line of the fluted disc (18), and just comes into contact with a vertex of the leftmost circular arc tooth (17); the right triangular convex edge (27) is located above the horizontal symmetric line of the fluted disc (18) and the rightmost circular arc tooth (17), and is just aligned with a valley bottom between two adjacent arc teeth (17); both the upper triangular convex edge (26) and the lower triangular convex edge (28) are located on a right side of the longitudinal symmetric line of the fluted disc (18), and respectively come into contact with a right side of the directly above circular arc tooth (17) and a right side of the directly below circular arc tooth (17); a distance from the left triangular convex edge (25) to the longitudinal symmetric line of the fluted disc (18) is indicated by $h_{max}$, a distance from the right triangular convex edge (24) to the longitudinal symmetric line of the fluted disc (18) is indicated by $h_{min}$, and a distance from a contact point between the upper triangular convex edge (26) and the directly above circular arc tooth (17) to the horizontal symmetric line of the fluted disc (18), and a distance from a contact point between the lower triangular convex edge (28) and the directly below circular arc tooth (17) to the horizontal symmetric line of the fluted disc (18) are both indicated by $h_{mid}$; a relationship indicated by a formula (1) exists among $h_{mid}$, $h_{min}$, and $h_{max}$:

$$h_{mid} = \frac{h_{min} + h_{max}}{2}, \qquad (1)$$

wherein $h_{min}$, $h_{mid}$, and $h_{max}$, are referred to as feature heights, $h_{min}$ is a minimum feature height, $h_{mid}$ is an average feature height, and $h_{max}$ is a maximum feature height; the dual-acting cantilever sensor comprises a left cantilever sensor (10) and a right cantilever sensor (13), and the two have a same structure and size, and are symmetrically arranged; the structure of the left cantilever sensor (10) comprises a variable-section elastic beam, a left holding clipping pin (11) fastened on a right side of a free end of the elastic beam, single-axis resistance strain gauges [$R_1$, $R_2$] stuck on left and right sides near a root portion of the cantilever, a left driving nut (6) embedded into the root portion of the cantilever, and a left dowel pin (5) fastened at a bottom portion of the cantilever, and the left cantilever sensor (10) is mounted on the rack (1) through cooperation between the left driving nut (6) and the left-hand threaded shaft of the segment II-III on the micro-metering lead screw (3) and cooperation between the left dowel pin (5) and a U-shaped guiding limiting slot (4); the structure of the right cantilever sensor (13) comprises a variable-section elastic beam, a right holding clipping pin (12) fastened on a left side of the free end of the elastic beam, single-axis resistance strain gauges [$R_3$, $R_4$] stuck on left and right sides near the root portion of the cantilever, a right driving nut (8) embedded into the root portion of the cantilever, and a right dowel pin (7) fastened to the bottom portion of the cantilever, and the right cantilever sensor (13) is mounted on the rack (1) through cooperation between the right driving nut (8) and the right-hand threaded shaft of the segment IV-V on the micro-metering lead screw (3) and cooperation between the right dowel pin (7) and the U-shaped guiding limiting slot (4); cooperation between the left dowel pin (5) and the U-shaped guiding limiting slot (4) and cooperation between the right dowel pin (7) and the U-shaped guiding limiting slot (4) enable the left cantilever sensor (10) and the right cantilever sensor (13) to be incapable of rotation, and to be capable of only horizontal movement, and when the drive lead screw (3) rotates, the left cantilever sensor (10) and the right cantilever sensor (13) are driven to move towards or away from each other along an axis of the micro-metering lead screw (3); a cooperation pair of the left driving nut (6) and the micro-metering lead screw (3) and a cooperation pair of the right driving nut (8) and the micro-metering lead screw (3) both use a clearance elimination measure, and when the micro-metering lead screw (3) changes a rotation direction, the left driving nut (6) and the right driving nut (8) can be driven to change a movement direction without hysteresis; the variable-section elastic beam of the left cantilever sensor (10) and the variable-section elastic beam of the right cantilever sensor (13) both have a same shape, size, and material, a cross section of a beam is rectangular, two segments that are a rigid segment ac and a flexible segment ce are obtained through division from a free end a to a root portion e, the rigid segment ac has a same width as the flexible segment ce, and a height H of the rigid segment ac is greater than a height h of the flexible segment ce; the left cantilever sensor (10) and the right cantilever sensor (13) are symmetrically positioned, and free ends of the two are vertically upward; the left holding clipping pin (11) and the right holding clipping pin (12) are coaxially positioned, and a vertex distance between the two is indicated by s; the resistance strain gauges $R_1$, $R_2$, $R_3$, and $R_4$ constitute a full-bridge measurement circuit, and a strain signal generated by the circuit is indicated by $\varepsilon_r$;

the etalon (0) comprises several standard block gauges, and an etalon positioning key (32) is provided beneath the standard block gauge; thickness values of the standard block gauges are sequentially indicated by $\delta_1$, $\delta_2$, ..., and $\delta_n$, and $\delta_1$, $\delta_2$, ..., and $\delta_n$ are also used to indicate standard block gauges with different thicknesses; the thickness values of the standard block gauges are arranged in an order of $\delta_1 < \delta_2$, ..., $\delta_n$, wherein n≥2, indicating a quantity of the standard block gauges; thicknesses of etalon positioning keys (32) of the standard block gauges are equal, and are indicated by t; any one of the standard block gauges is selected, and is defined as a reference gauge, and a thickness value of the reference gauge is defined as a reference thickness, and is indicated by $\delta_0$; an arithmetic mean of $\delta_1$, $\delta_2$, ..., $\delta_n$ is indicated by $\bar{\delta}$;

the positioning block (DK) is a block whose lower portion is provided with a slot (34), and a width of the slot (34) has a same nominal size as a length of the circular shaft of the segment III-IV on the micro-metering lead screw (3); the slot (34) cooperates two end surfaces that are left and right end surfaces of the circular shaft of the segment to insert the positioning block (DK) into a top portion of the circular shaft of the segment and a right side surface of a root portion of the left cantilever sensor (10) and a left side surface of a root portion of the right cantilever sensor (13) respectively abut against two end surfaces that are left and right end surfaces in a length direction of the positioning block (DK); in this way, a distance $S_0$ between the left holding clipping pin (11) and the right holding clipping pin (12) is less than a minimum thickness value $\delta_1$ of the etalon, in other words, $S_0 < \delta_1$; $S_0$ is defined as a reference distance of the dual-acting cantilever sensor, and is briefly referred to as a reference distance;

the tested piece (SJ) is a plate sample for a material mechanical property test, a curved section sample, or another rigid mechanical part whose thickness needs to be measured;

the etalon support (BZ) comprises two columns that are front and rear columns having a same shape and size, a top portion of the column is provided with an etalon positioning slot (9), and a bottom portion of the column is provided with an etalon support positioning key (23); a nominal width of the etalon positioning slot (9) is equal to a nominal thickness t of the etalon positioning key (32) on the standard block gauge; the etalon support positioning key (23) has the same nominal width as the support positioning slot (22); when the etalon support positioning key (23) is inserted into the support positioning slot (22), a longitudinal symmetric plane of the etalon positioning slot (9) coincides with a longitudinal symmetric plane of the left holding clipping pin (11) and a longitudinal symmetric plane of the right holding clipping pin (12);

the tested piece support (SZ) is of a "H"-shaped structure, an upper portion of the tested piece support is a platform or a platform surface of another shape processed according to geometric parameters of the tested piece (SJ), and two columns that are front and rear columns having a same shape and size are provided beneath the tested piece support; a tested piece support positioning key (33) is provided at a bottom portion of the column;

the driver (19) is a driving mechanism for driving the micro-metering lead screw (3) to perform forward and reverse rotation;

the digital controller is a microcomputer system comprising a strain signal collection-conditioning circuit, a driver control circuit, and measurement software; the measurement software is designed and implemented according to the following measurement method and idea;

a mechanism combining the coding lead screw and the dual-acting cantilever works in the following manner:

(1) connection of measurement circuits of the tri-state encoder: resistance strain gauges [$R_5$, $R_6$], [$R_7$, $R_8$], [$R_9$, $R_{10}$], and [$R_{11}$, $R_{12}$] separately access the digital controller in a half-bridge manner, and $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ are respectively used to indicate strain readings of the four half-bridge measurement circuits measured by the digital controller;

(2) adjustment of a zero position of the measurement circuit of the tri-state encoder: the digital controller is configured to control the driver (19) to operate, to drive the fluted disc (18) to rotate, the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ measured by the digital controller accordingly periodically change continuously, and a change period is indicated by T; each time the fluted disc (18) rotates by one tooth, in other words, one period T, the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ separately complete circulation once; a change in $\varepsilon_{r(R_5,R_6)}$ is tracked and observed, and when $\varepsilon_{r(R_5,R_6)}$ reaches a minimum value $\varepsilon_{rmin}$, the fluted disc (1) stops rotating, and the digital controller (19) is configured to adjust a balanced circuit of a bridge on which the resistance strain gauges [$R_5$, $R_6$] are located, so that $\varepsilon_{r(R_5,R_6)}=0$; the foregoing actions are repeated, and when $\varepsilon_{r(R_7,R_8)}$, $\varepsilon_{r(R_9,R_{10})}$, and $\varepsilon_{r(R_{11},R_{12})}$ reaches the minimum value $\varepsilon_{rmin}$, balanced circuits of bridges on which the resistance strain gauges [$R_7$, $R_8$], [$R_9$, $R_{10}$], and [$R_{11}$, $R_{12}$] are located are sequentially adjusted, so that $\varepsilon_{r(R_7,R_8)}=0$, $\varepsilon_{r(R_9,R_{10})}=0$, and $\varepsilon_{r(R_{11},R_{12})}=0$; after zero positions of four half-bridge measurement circuits are adjusted, the fluted disc (18) rotates, and in this way, the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ all cyclically change between a minimum value 0 and a maximum value $\varepsilon_{rmax}$, the minimum value 0 corresponds to a valley bottom position between adjacent circular arc teeth (17) over against the left triangular convex edge (25), the upper triangular convex edge (26), the right triangular convex edge (27), or the lower triangular convex edge (28), in other words, corresponds to the minimum feature height $h_{min}$, and the maximum value $\varepsilon_{rmax}$ corresponds to a position at which the left triangular convex edge (25), the upper triangular convex edge (26), the right triangular convex edge (27), or the lower triangular convex edge (28) comes into contact with a vertex of the circular arc tooth (17), in other words, corresponds to the maximum feature height $h_{max}$; the foregoing method for adjusting the zero position of the measurement circuit of the tri-state encoder (SB) is referred to as a four-step zero position adjustment method;

(3) determining a relationship between a strain reading and a rotation status of the fluted disc: after adjustment of the zero position of the measurement circuit of the tri-state encoder (SB) is completed, it is specified that numbers 1, 0, and ½ are respectively used to indicate the maximum value $\varepsilon_r$, the minimum value 0, and an average value $0.5\varepsilon_{rmax}$ of the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$; the number 1 corresponds to the maximum feature height $h_{max}$, and is defined as a full value; the number 0 corresponds to the minimum feature height $h_{min}$, and is defined as a null value; the number ½ corresponds to the average feature height $h_{mid}$, and is defined as a mid-value; the full value, the null value, and the mid-value are together defined as tri-state coded values of the strain readings $\varepsilon_{r(R_5,R_6)}$, $\varepsilon_{r(R_7,R_8)}$, $\varepsilon_{r(R_9,R_{10})}$, and $\varepsilon_{r(R_{11},R_{12})}$ and the tri-state coded values are briefly referred to as tri-state values; when the fluted disc (18) rotates, the tri-state values 0, ½, and 1 cyclically change based on the period T; the cyclic change of the tri-state values is used to determine a rotation status of the fluted disc (18), in other words, a rotation direction and a rotation angle;

(4) determining a relative displacement between the left cantilever sensor (10) and the right cantilever sensor (13): the driver (19) is controlled to operate, so that the left cantilever sensor (10) and the right cantilever sensor (13) move toward each other, until the two respectively abut against the two end surfaces that are the left and right end surfaces of the circular shaft of the segment III-IV on the micro-metering lead screw (3); a current position of the left cantilever sensor (10) and a current position of the right cantilever sensor (13) are respectively used as displacement origins of the two, and a current position of the fluted disc (18) is recorded as a fluted disc zero position; or the left cantilever sensor (10) and the right cantilever sensor (13) are moved to a specified position or any position within a movement range, a current position of the left cantilever sensor (10) and a current position of the right cantilever sensor (13) are used as displacement origins of the two, and a current position of the fluted disc (18) is recorded as a fluted disc zero position; the fluted disc (18) is driven to rotate from the fluted disc zero position, so that the left cantilever sensor (10) and the right cantilever sensor (13) starts from the displacement origins to move towards or away from each other; S is used to indicate the relative displacement between the left cantilever sensor (10) and the right cantilever sensor (13), and is calculated by using a formula (2);

$$S = 2t\frac{n_{z,s} - n_{z,n}}{N_c} = 2t\frac{n_z}{N_c}, \qquad (2)$$

wherein in the formula (2), t indicates a lead of the drive lead screw (3), $N_c$ indicates a quantity of teeth of the fluted disc (18), $n_{z,s}$ indicates an accumulated quantity of teeth by which the fluted disc (18) clockwise rotates from the fluted disc zero position, $n_{z,n}$ indicates an accumulated quantity of teeth by which the fluted disc (18) anticlockwise rotates from the fluted disc zero position, $n_{z,s}$ and $n_{z,n}$ are constantly positive values, $n_z$ indicates a difference between $n_{z,s}$ and $n_{z,n}$, and is defined as an effective quantity of rotation teeth; $n_{z,s}$, $n_{z,n}$, and $n_z$ are also referred to as rotation parameters of the fluted disc; $n_z$ and S are algebraic quantities, when the fluted disc (18) clockwise rotates, the left cantilever sensor (10) and the right cantilever sensor (13) move away from each other, and symbols of $n_z$ and S are both "+"; when the fluted disc (18) anticlockwise rotates, the left cantilever sensor (10) and the right cantilever sensor (13) move towards each other, and symbols of $n_z$ and S are both "−"; and a method and operation steps for measuring a thickness by the measurement host (ZJ) are as follows:

(1) adjustment of a zero position of the tri-state encoder: four half-bridge measurement circuits comprising the resistance strain gauges [$R_5$, $R_6$], [$R_7$, $R_8$], [$R_9$, $R_{10}$], and [$R_{11}$, $R_{12}$] separately access the digital controller, and zero positions of the measurement circuits of the tri-state encoder (SB) are adjusted based on the foregoing four-step zero position adjustment method;

(2) setting a reference distance, a displacement origin, and the fluted disc zero position: the positioning block (DK) is inserted right above the circular shaft of the segment III-IV on the drive lead screw (3); the digital controller is configured to control the fluted disc (18) to rotate, and adjust positions of the left cantilever sensor (10) and the right cantilever sensor (13), and when the two simultaneously abut against the positioning block (DK), the fluted disc (18) stops rotating, and the positioning block (DK) is taken down; in this case, a distance between the left holding clipping pin (11) and the right holding clipping pin (12) is the reference distance $S_0$; a status of the dual-acting cantilever sensor with the reference distance of $S_0$ is set, and is defined as a reference state; in the reference state, a current position of the fluted disc (18) is recorded as the fluted disc zero position, and a current position of the left cantilever sensor (10) and a current position of the right cantilever sensor (13) are respectively recorded as displacement origins thereof;

(3) calibration of the measurement system: a full-bridge measurement circuit comprising the resistance strain gauges $R_1$, $R_2$, $R_3$, and $R_4$ accesses the digital controller; the two columns of the etalon support (BZ) are respectively inserted into the support positioning slots (22) on front and rear sides of the base plate (B) by using the etalon support positioning keys (23); the standard block gauges $\delta_1, \delta_2, \ldots,$ and $\delta_n$ of the etalon (0) are sequentially inserted into the etalon positioning slot (9) at a top portion of the etalon support (BZ) by using the etalon positioning key (32), and the digital controller records corresponding strain readings $\varepsilon_{r1}, \varepsilon_{r2}, \ldots,$ and $\varepsilon_{rn}$; $\varepsilon_{r1}, \varepsilon_{r2}, \ldots,$ and $\varepsilon_{rn}$ are used as calibration numbers, and the thickness is calculated based on a function relationship between a thickness value $\delta$ and a strain reading $\varepsilon_r$ of the digital controller, in other words, the formula (3);

$$\delta = \frac{\varepsilon_r - B}{A}, \quad (3)$$

wherein in the formula (3), A and B are constants, and are respectively calculated by using formulas (4) and (5):

$$A = \frac{n\sum_i^n \delta_i \varepsilon_{ri} - \sum_i^n \delta_i \sum_i^n \varepsilon_{ri}}{n\sum_i^n \delta_i^2 - \left(\sum_i^n \delta_i\right)^2}; \text{ and} \quad (4)$$

$$B = \frac{\sum_i^n \varepsilon_{ri} \sum_i^n \delta_i^2 - \sum_i^n \delta_i \sum_i^n \delta_i \varepsilon_{ri}}{n\sum_i^n \delta_i^2 - \left(\sum_i^n \delta_i\right)^2}, \quad (5)$$

wherein in the formulas (4) and (5), n indicates a quantity of standard block gauges, $\delta_i$ indicates thickness values of standard block gauges with different thicknesses, $\varepsilon_{ri}$ indicates a strain reading corresponding to $\delta_i$, that is, the calibration numbers $\varepsilon_{r1}, \varepsilon_{r2}, \ldots,$ and $\varepsilon_{rn}$; a calibration number corresponding to the reference thickness $\delta_0$ is a reference strain reading, and is indicated by a symbol $\varepsilon_{r0}$; and (4) measurement: the positioning block (DK) is taken from the measurement host (ZJ), and the two columns of the tested piece support (SZ) are respectively inserted into the support positioning slots (22) on the two sides that are the front and rear sides of the base plate (B) by using the tested piece support positioning keys (33); the digital controller is configured to control the fluted disc (18) to rotate, and adjust a vertex distance S between the left holding clipping pin (11) and the right holding clipping pin (12), so that the vertex distance is greater than the thickness of the tested piece (SJ), and the tested piece (SJ) is placed on the tested piece support (SZ), so that two tested surfaces of the tested piece (SJ) are perpendicular to an axis of the left holding clipping pin (11) and an axis of the right holding clipping pin (12); S is adjusted again, so that the left holding clipping pin (11) and the right holding clipping pin (12) hold the tested piece (SJ), and when strain readings $\varepsilon_r = \varepsilon_{r0}$ or $\varepsilon_r \approx \varepsilon_{r0}$, the fluted disc (18) stops rotating; thickness of the tested piece (SJ) is calculated based on the following method and by using the current strain reading $\delta$ and the parameters $n_z$, $n_{z,s}$, and $n_{z,n}$ of the fluted disc:

(a) substituting $\varepsilon_r$ into the formula (3), and using $\delta^*$ to indicate a calculation result, that is, $$\delta^* = \frac{\varepsilon_r - B}{A} \quad (6)$$

(b) substituting $n_z$, $n_{z,s}$, and $n_{z,n}$ into the formula (2), to obtain the relative displacement S between the left cantilever sensor (10) and the right cantilever sensor (13); and (c) substituting $\delta^*$ and S into the formula (7), to obtain the thickness $\delta$ of the tested piece (SJ):

$$\delta = \delta^* + S \quad (7).$$

* * * * *

UNITED STATES PATENT AND TRADEMARK OFFICE
CERTIFICATE OF CORRECTION

| | | |
|---|---|---|
| PATENT NO. | : 11,774,230 B2 | Page 1 of 1 |
| APPLICATION NO. | : 17/001869 | |
| DATED | : October 3, 2023 | |
| INVENTOR(S) | : Shuying Qu et al. | |

It is certified that error appears in the above-identified patent and that said Letters Patent is hereby corrected as shown below:

On the Title Page

At item (71), Please replace "Yantai Unversity" with -- Yantai University --

At item (73), Please replace "Yantai Unversity" with -- Yantai University --

Signed and Sealed this
Sixth Day of August, 2024

Katherine Kelly Vidal
*Director of the United States Patent and Trademark Office*